United States Patent
Mendelsohn

(10) Patent No.: US 10,735,089 B2
(45) Date of Patent: Aug. 4, 2020

(54) BROADBAND SATELLITE COMMUNICATION SYSTEM USING OPTICAL FEEDER LINKS

(71) Applicant: VIASAT, INC., Carlsbad, CA (US)

(72) Inventor: Aaron J Mendelsohn, Dana Point, CA (US)

(73) Assignee: VIASAT, Inc., Carlsbad, CA (US)

( * ) Notice: Subject to any disclaimer, the term of this patent is extended or adjusted under 35 U.S.C. 154(b) by 0 days.

(21) Appl. No.: 16/547,081

(22) Filed: Aug. 21, 2019

(65) Prior Publication Data
US 2019/0379449 A1    Dec. 12, 2019

Related U.S. Application Data

(60) Division of application No. 16/023,320, filed on Jun. 29, 2018, which is a continuation of application No. PCT/US2016/069628, filed on Dec. 30, 2016.

(60) Provisional application No. 62/273,730, filed on Dec. 31, 2015.

(51) Int. Cl.
| | |
|---|---|
| H04B 10/118 | (2013.01) |
| H04B 7/204 | (2006.01) |
| H04B 7/185 | (2006.01) |
| H01Q 25/00 | (2006.01) |
| H01Q 1/28 | (2006.01) |

(52) U.S. Cl.
CPC ....... *H04B 7/2041* (2013.01); *H04B 7/18513* (2013.01); *H04B 7/18515* (2013.01); *H04B 7/18517* (2013.01); *H04B 10/118* (2013.01); *H01Q 1/288* (2013.01); *H01Q 25/00* (2013.01)

(58) Field of Classification Search
CPC .............. H04B 10/118; H04B 10/0795; H04B 7/2041; H04B 7/18517; H04B 7/18515; H04B 7/18513; H01Q 1/288; H01Q 25/00
USPC ....................................................... 455/12.1
See application file for complete search history.

(56) References Cited

U.S. PATENT DOCUMENTS

| | | |
|---|---|---|
| 5,220,320 A | 6/1993 | Assal et al. |
| 5,661,582 A | 8/1997 | Kintis et al. |
| 5,870,216 A | 2/1999 | Brock et al. |
| 6,125,261 A | 9/2000 | Anselmo et al. |
| 6,181,450 B1 | 1/2001 | Dishman et al. |
| 6,246,498 B1 | 6/2001 | Dishman et al. |
| 6,339,707 B1 | 1/2002 | Wainfan et al. |
| 6,340,948 B1 | 1/2002 | Munoz-Garcia et al. |

(Continued)

FOREIGN PATENT DOCUMENTS

| | | |
|---|---|---|
| EP | 0 472 018 A | 2/1992 |
| EP | 0472018 | 2/1992 |

(Continued)

OTHER PUBLICATIONS

European Search Report in related European Patent Application No. EP19196280, dated Jan. 17, 2020.

(Continued)

*Primary Examiner* — Shaima Q Aminzay
(74) *Attorney, Agent, or Firm* — Kilpatrick Townsend & Stockton, LLP

(57) ABSTRACT

Broadband satellite communications systems using optical feeder links are disclosed. Various optical modulation schemes are disclosed that can provide improved capacity for fixed spot beam, on board beamforming, and ground-based beamforming broadband satellite systems.

7 Claims, 26 Drawing Sheets

(56) References Cited

U.S. PATENT DOCUMENTS

| | | |
|---|---|---|
| 6,404,398 B1 | 6/2002 | Chen et al. |
| 6,804,434 B1 | 10/2004 | Chandrasekhar et al. |
| 7,103,280 B1 | 9/2006 | Ionov et al. |
| 7,110,678 B2 | 9/2006 | Willebrand et al. |
| 7,274,876 B2 | 9/2007 | Gerszberg et al. |
| 7,379,669 B2 | 5/2008 | Kim |
| 9,264,147 B2 | 2/2016 | Caplan et al. |
| 2001/0018327 A1 | 8/2001 | Houston et al. |
| 2002/0089726 A1 | 7/2002 | He et al. |
| 2003/0138189 A1 | 7/2003 | Rockwell et al. |
| 2004/0157554 A1 | 8/2004 | Wesel |
| 2005/0100339 A1* | 5/2005 | Tegge, Jr. ............ H04B 10/118 398/125 |
| 2008/0220731 A1 | 9/2008 | West |
| 2014/0341586 A1 | 11/2014 | Wyler |
| 2016/0006950 A1 | 1/2016 | Sainct et al. |
| 2016/0308601 A1 | 10/2016 | Mochida |
| 2019/0149228 A1 | 5/2019 | Ziskind et al. |

FOREIGN PATENT DOCUMENTS

| | | |
|---|---|---|
| EP | 0982803 A2 | 3/2000 |
| EP | 1052869 | 11/2000 |
| EP | 1052869 A2 | 11/2000 |
| EP | 1482659 A2 | 12/2004 |
| EP | 1482659 A3 | 5/2005 |
| EP | 2723001 | 10/2013 |
| EP | 2723001 B1 | 10/2013 |
| EP | 0982803 | 3/2020 |
| FR | 3023435 | 7/2016 |
| WO | 2002032020 | 4/2002 |
| WO | WO 2002/032020 A1 | 4/2002 |
| WO | 2015104861 | 7/2015 |
| WO | WO 2015/104861 | 7/2015 |

OTHER PUBLICATIONS

Chan, Vincent W. S.—"Future Integrated Broadband Fiber, Wireless, and Satellite Networks", Proc. SPIE 6388 (Oct. 2, 2006) doi: 10.1117/12.674529 Proceedings of SPIE, SPIE Digital Library.org/conference-proceedings-of-Spie, Listed on EPO Observation EP16829477.5—Sep. 4, 2019.

Chan Vincent W. S.—"Optical Satellite Networks", Journal of Lightwave Technology IEEE Service Center, New York, New York ((20031101), vol. 21, No. 11, dol 10 1109/JLT.2003 819534, ISSN 0733-8724, pp. 2811-2827 XP011103959.

Cox III et al., "Limits on the Performance of RF-Over-Fiber Links and Their Impact on Device Design", IEEE Transactions on Microwave Theory and Techniques, vol. 54, No. 2, Feb. 2006, pp. 906-921.

Dimitrov, et al. "Digital Modulation and Coding for Satellite Optical Feeder Links with Pre-Distortion Adaptive Optics", International Journal of Satellite Communications and Networking, Int. J. Satell. Commun. Network, 2015; 00:1-22.

EPO Third Party Observations, Sep. 4, 2019, Application No. EP16829477.5.

Gregory, et al. Commercial Optical Inter-Satellite Communication at High Data Rates, Optical Engineering 51(3), 031202 Mar. 2112.

Henniger et al., "An Introduction to Free-space Optical Communications", Radioengineering, vol. 19, No. 2, Jun. 2010, pp. 203-212.

Chilean Exam Report, dated May 17, 2019, 7 pages.

Chilean Exam Report, dated Sep. 17, 2019, 10 pages.

Columbian Office Action, dated Sep. 5, 2019, 14 pages.

International Preliminary Report on Patentability mailed in International (PCT) Application No. PCT/US2016/069628 dated Jul. 12, 2018, 14 pgs.

International Search Report and Written Opinion mailed in International (PCT) Application No. PCT/US2016/069628 dated Jun. 8, 2017, 20 pgs.

Jambrina, "High Capacity Radio over Fiber Transmission Links", DTU Fotonik, Aug. 1, 2011, 138 pgs.

Kaushal et al., "Free Space Optical Communication: Challenges and Mitigation Techniques", ITM University, http://arxiv.org/pdf/1506.04836.pdf, Jun. 16, 2015, 28 pgs.

Perlot et al., "Optical GEO Feeder Link Design", Future Network & Mobile Summit, IIMC International Information Management Corporation, www.FutureNetworkSummit.eu/2012, https://pdfs.semanticscholar.org/4327/574b8a04968521e9lcad9983b2d298172812.pdf, 2012, 8 pgs.

Perlot, Nicolas, "Throughput Maximization of Optical LEO-Ground Links", Proc. of SPIE vol. 8246, 82460V-1, Jul. 2012.

Roy, et al. "Optical Feeder Links for High Throughput Satellites", Airbus/DLR/Thales Journal Paper 1: Oct. 2015.

Vidal, et al, "Next Generation High Throughput Satellite System Based on Optical Feeder Links" Airbus/DLR/Thales Journal Paper 2: Oct. 2015.

Gregory, e al. Commerical Optical Inter-Satellite Communication at High Data Rates, Optical Engineering 51(3), 031202 Mar. 2112.

Kaushal et at, "Free Space Optical Communication: Challenges and Mitigation Techniques", ITM University, http://arxiv.org/pdf/1506.04836.pdf, Jun. 16, 2015, 28 pgs.

Perlot et al., "Optical GEO Feeder Link Design", Future Network & MobileSummit, IIMC International Information Management Corporation, www.FutureNetworkSummit.eu/2012, https://pdfs.semantiescholar.org/4327/574b8a04968521e9lcad9983b2d298172812.pdf, 2012, 8 pgs.

* cited by examiner

BROADBAND SATELLITE COMMUNICATION SYSTEM USING OPTICAL FEEDER LINKS

This application is a divisional of application Ser. No. 16/023,320, filed 29 Jun. 2018, which is a continuation of application no. PCT/US16/69628, filed 30 Dec. 2016, which claims the benefit of application No. 62/273,730, filed 31 Dec. 2015, each of which is incorporated by reference herein.

TECHNICAL FIELD

The disclosed techniques relates to broadband satellite communications links and more specifically to satellites using optical links for broadband communication between satellite access nodes and the satellites.

BACKGROUND

Satellite communications systems provide a means by which data, including audio, video and various other sorts of data can be communicated from one location to another. The use of such satellite communications systems has gained in popularity as the need for broadband communications has grown. Accordingly, the need for greater capacity over each satellite is growing.

In satellite systems, information originates at a station (which in some instances is a land-based, but which may be airborne, seaborne, etc.) referred to here as a Satellite Access Node (SAN) and is transmitted up to a satellite. In some embodiments, the satellite is a geostationary satellite. Geostationary satellites have orbits that are synchronized to the rotation of the Earth, keeping the satellite essentially stationary with respect to the Earth. Alternatively, the satellite is in an orbit about the Earth that causes the footprint of the satellite to move over the surface of the Earth as the satellite traverses its orbital path.

Information received by the satellite is retransmitted to a user beam coverage area on Earth where it is received by a second station (such as a user terminal). The communication can either be uni-directional (e.g., from the SAN to the user terminal), or bi-directional (i.e., originating in both the SAN and the user terminal and traversing the path through the satellite to the other). By providing a relatively large number of SANs and spot beams and establishing a frequency re-use plan that allows a satellite to communicate on the same frequency with several different SANs, it may be possible to increase the capacity of the system. User spot beams are antenna patterns that direct signals to a particular user coverage area (e.g., a multi beam antenna in which multiple feeds illuminate a common reflector, wherein each feed produces a different spot beam). However, each SAN is expensive to build and to maintain. Therefore, finding techniques that can provide high capacity with few such SANs is desirable.

Furthermore, as the capacity of a satellite communication system increases, a variety of problems are encountered. For example, while spot beams can allow for increased frequency reuse (and thus increased capacity), spot beams may not provide a good match to the actual need for capacity, with some spot beams being oversubscribed and other spot beams being undersubscribed. Increased capacity also tends to result in increased need for feeder link bandwidth. However, bandwidth allocated to feeder links may reduce bandwidth available for user links. Accordingly, improved techniques for providing high capacity broadband satellite systems are desirable.

BRIEF DESCRIPTION OF THE DRAWINGS

The disclosed techniques, in accordance with one or more various embodiments, is described with reference to the following figures. The drawings are provided for purposes of illustration only and merely depict examples of some embodiments of the disclosed techniques. These drawings are provided to facilitate the reader's understanding of the disclosed techniques. They should not be considered to limit the breadth, scope, or applicability of the claimed invention. It should be noted that for clarity and ease of illustration these drawings are not necessarily made to scale.

FIG. 18 shows of an example of the components of a satellite in greater detail.

The figures are not intended to be exhaustive or to limit the claimed invention to the precise form disclosed. It should be understood that the disclosed techniques can be practiced with modification and alteration, and that the invention should be limited only by the claims and the equivalents thereof.

DETAILED DESCRIPTION

Initially, a system that uses radio frequency (RF) communication links between satellite access nodes (SANs) and a satellite is discussed. Following this introduction is a discussion of several optical transmission techniques for broadband capacity satellites. Following an introductory discussion of systems having an optical feeder link, three techniques are discussed for modulating signals on an optical feeder link. In addition, three architectures are provided for implementing the techniques.

Figure 1:
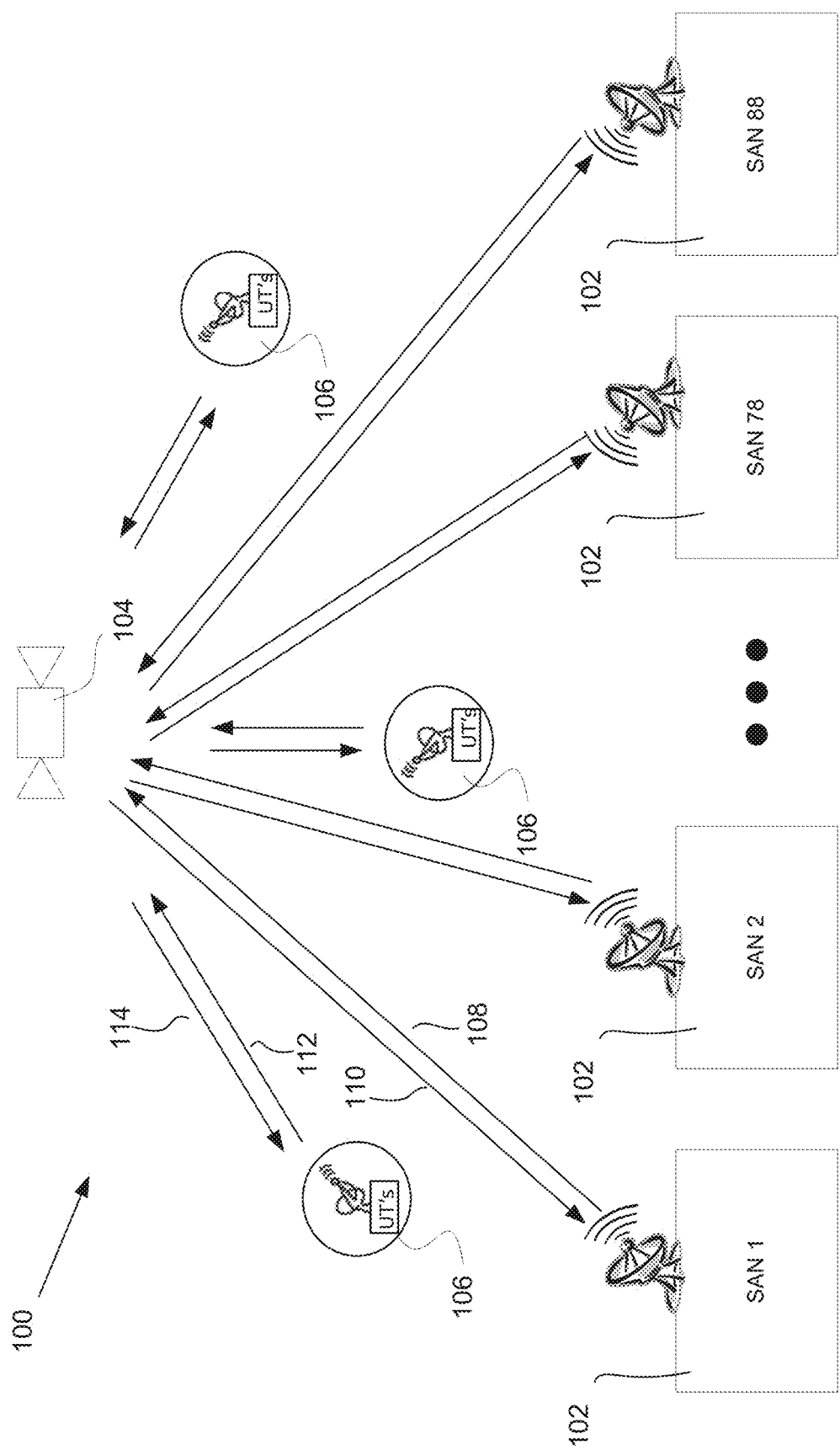
FIG. 1 is an illustration of an example of a satellite communications system using radio frequency signals to communicate with the satellite and having a relatively large number of satellite access nodes ("SANs", also known as "gateways") to create a high capacity system.

FIG. 1 is an illustration of a satellite communications system 100 in which a relatively large number of stations (referred to herein as "SANs", also referred to as "gateways") 102 communicate with a satellite 104 using RF signals on both feeder and user links to create a relatively large capacity system 100. Information is transmitted from the SANs 102 over the satellite 104 to a user beam coverage area in which a plurality of user terminals 106 may reside. In some embodiments, the system 100 includes thousands of user terminals 106. In some such embodiments, each of the SANs 102 is capable of establishing a feeder uplink 108 to the satellite 104 and receiving a feeder downlink 110 from the satellite 104. In some embodiments, feeder uplinks 108 from the SAN 102 to the satellite 104 have a bandwidth of 3.5 GHz. In some embodiments, the feeder uplink signal can be modulated using 16 quadrature amplitude modulation (QAM). Use of 16 QAM modulation yields about 3 bits per second per Hertz. By using 3.5 GHz bandwidth per spot beam, each spot beam can provide about 10-12 Gbps of capacity. By using 88 SANs, each capable of transmitting a 3.5 GHz bandwidth signal, the system has approximately a 308 GHz bandwidth or a capacity of about 1000 Gbps (i.e., 1 Tbps).

Figure 2:
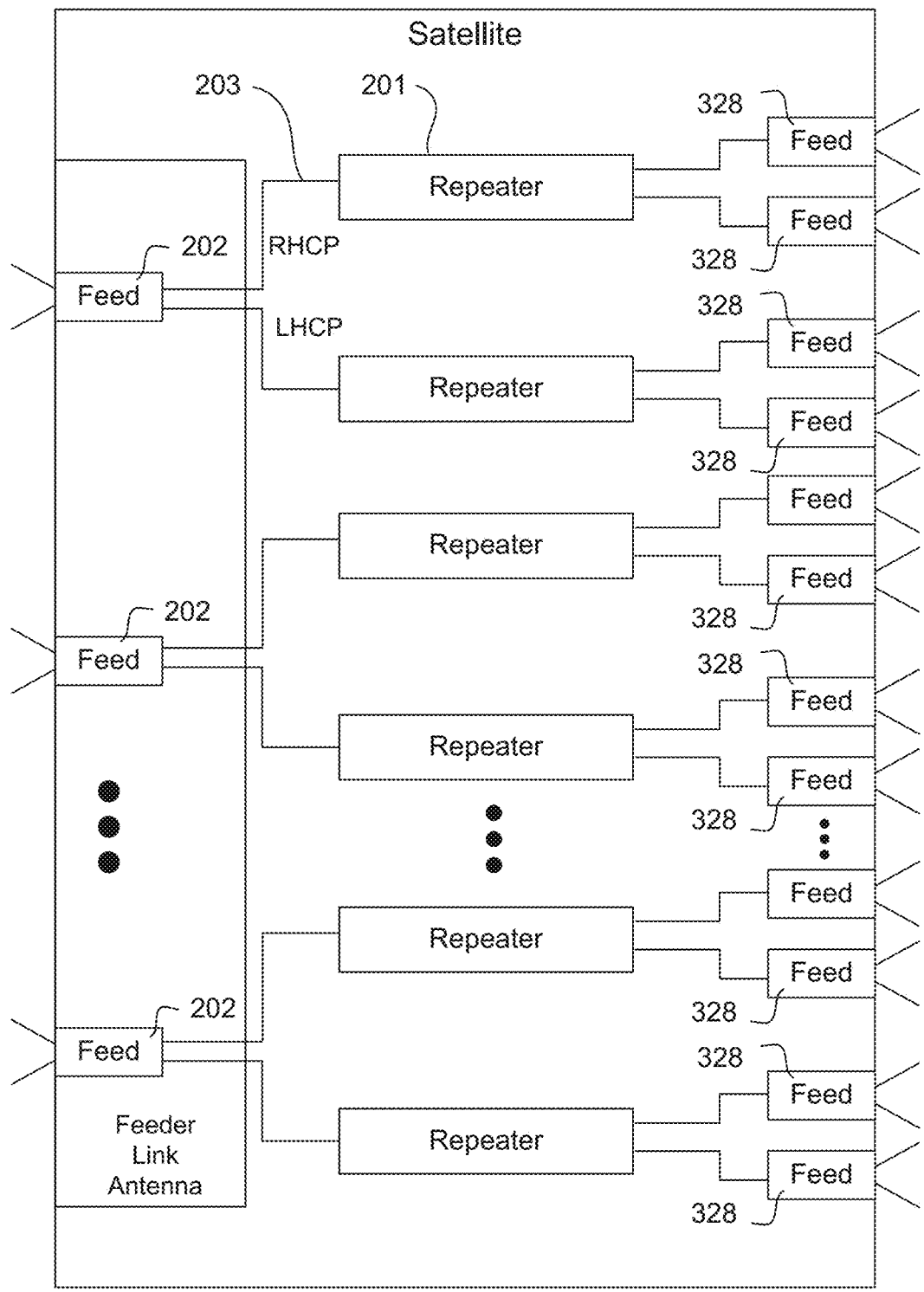
FIG. 2 is an illustration of a simplified satellite that uses RF signals to communicate with SANs.
Figure 3:
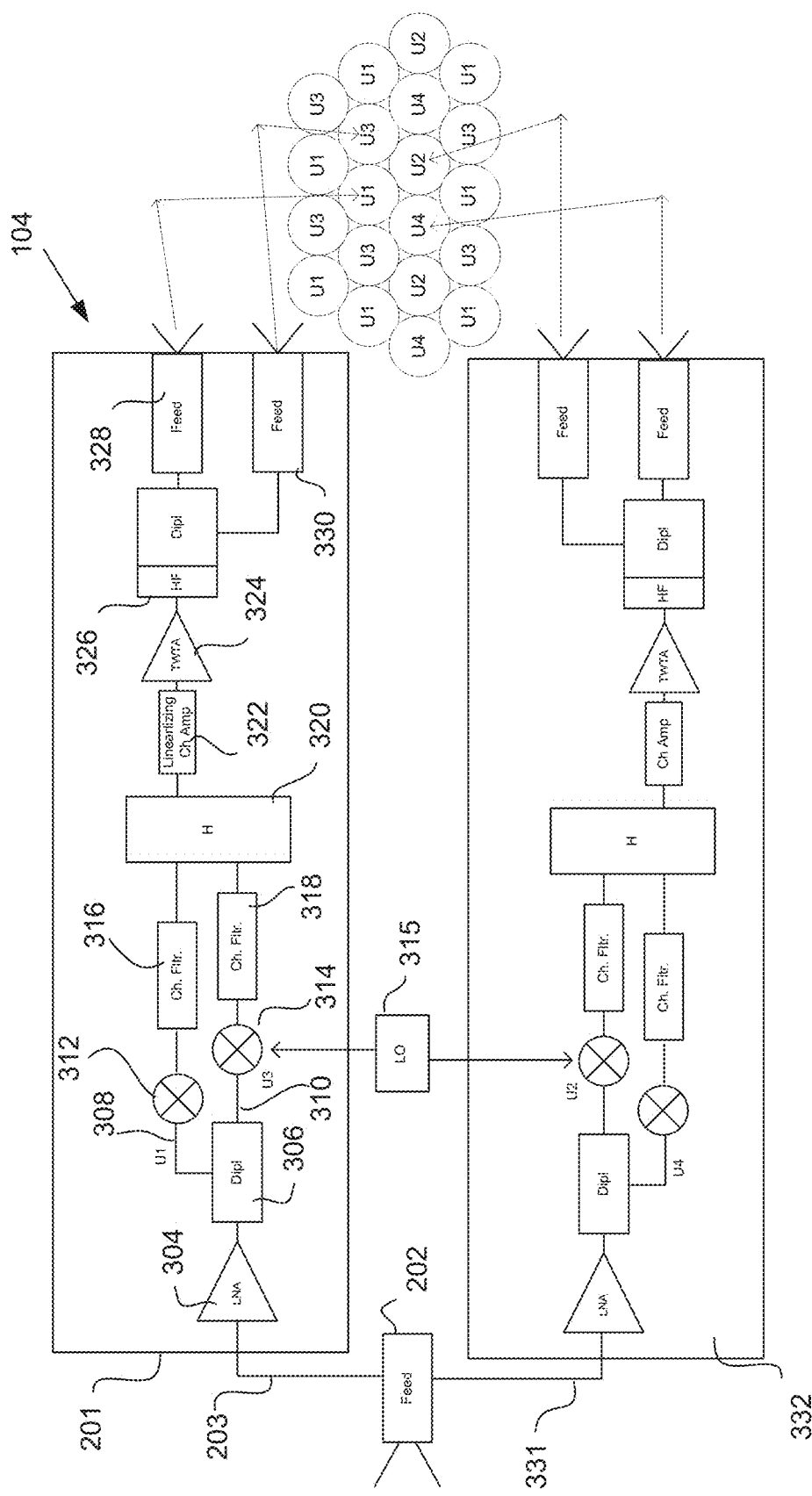
FIG. 3 is a simplified illustration of an example of the repeaters used on the forward link.

FIG. 2 is an illustration of a simplified satellite that can be used in the system of FIG. 1, wherein the satellite uses RF signals to communicate with SANs. FIG. 3 is a simplified illustration of the repeaters 201 used on the forward link (i.e., receiving the RF feeder uplink and transmitting the RF user downlink) in the satellite of FIG. 2. A feed 202 within the feeder link antenna (not shown) of the satellite 104 receives an RF signal from a SAN 102. Although not shown in detail, the user link antenna can be any of: one or more multi beam antenna array (e.g., multiple feeds illuminate a shared reflector), direct radiating feeds, or other suitable configurations. Moreover, user and feeder link antennas can share feeds (e.g., using dual-band combined transmit, receive), reflectors, or both. In one embodiment, the feed 202 can receive signals on two orthogonal polarizations (i.e., right-hand circular polarization (RHCP) and left-hand circular polarization (LHCP) or alternatively, horizontal and vertical polarizations). In one such embodiment, the output 203 from one polarization (e.g., the RHCP) is provided to a first repeater 201. The output is coupled to the input of a Low noise amplifier (LNA) 304 (see FIG. 3). The output of the LNA 304 is coupled to the input of a diplexer 306. The diplexer splits the signal into a first output signal 308 and second output signal 310. The first output signal 308 is at a first RF frequency. The second output signal 310 is at a second RF frequency. Each of the output signals 308, 310 are coupled to a frequency converter 312, 314. A local oscillator (LO) 315 is also coupled to each of the frequency converters 312, 314. The frequency converters shift the frequency of the output signals to a user downlink transmission frequency. In some embodiments, the same LO frequency is applied to both frequency converters 312, 314. The output of the frequency converters 312, 314 is coupled through a channel filter 316, 318 to a hybrid 320. The hybrid 320 combines the output of the two channel filters 316, 318 and couples the combined signal to a linearizing channel amplifier 322.

Combining the signals within the hybrid 320 allows the signals to be amplified by one traveling wave tube amplifier (TWTA) 324. The output of the linearizing channel amplifier 322 is coupled to the TWTA 324. The TWTA 324 amplifies the signal and couples the amplified output to the input of a high pass filter and diplexer 326. The high pass filter and diplexer 326 split the signal back into two outputs based on the frequency of the signals, with a higher frequency portion of the signal being coupled to a first antenna feed 328 and a lower frequency portion of the signal being coupled to a second antenna feed 330. The first antenna feed 328 transmits a user downlink beam to a first user beam coverage area U1. The second antenna feed 330 transmits a user downlink beam to a second user beam coverage area U3.

The output 331 of the feed 202 from the second polarization (e.g., LHCP) is coupled to a second arm 332 of the repeater. The second arm 332 functions in a manner similar to the first 201, however the output frequencies transmitted to the user beam coverage areas U2 and U4 will be different from the frequencies transmitted to the user beam coverage areas U1 and U3.

In some embodiments, an optical link can be used to increase the bandwidth of the feeder uplink 108 from each SAN 102 to the satellite 104 and the feeder downlink 110 from the satellite to each SAN 102. This can provide numerous benefits, including making more spectrum available for the user links. Furthermore, by increasing the bandwidth of the feeder links 108, 110, the number of SANs 102 can be reduced. Reducing the number of SANs 102 by increasing the bandwidth of each feeder link to/from each SAN 102 reduces the overall cost of the system without reducing the system capacity. However, one of the challenges associated with the use of optical transmission signals is that optical signals are subject to attenuation when passing through the atmosphere. In particular, if the sky is not clear along the path from the satellite to the SANs, the optical signal will experience significant propagation loss due to the attenuation of the signals.

In addition to attenuation due to reduced visibility, scintillation occurs under adverse atmospheric conditions. Therefore, techniques can be used to mitigate against the effects of fading of the optical signal due to atmospheric conditions. In particular, as will be discussed in greater detail below, the lenses on board the satellite used to receive the optical signals and the lasers on board the satellite used to transmit optical signals can be directed to one of several SANs. The SANs are dispersed over the Earth so that they tend to experience poor atmospheric conditions at different times (i.e., when fading is likely on the path between the satellite and a particular SAN, it will be relatively unlikely on the path between the satellite and each of the other SANs).

By taking into account the differences in atmospheric conditions in different parts of the country, the decision can be made when the atmosphere between the satellite and a particular SAN is unfavorable to the transmission of an optical signal, to use a different SAN to which the atmospheric conditions are more favorable. For example, the southwest of the continental United States has relatively clear skies. Accordingly, SANs can be located in these clear locations in the country to provide a portal for data that would otherwise be sent through SANs in other parts of the country when the sky between those SANs and the satellite is obstructed.

In addition to directing the satellite to communicate with those SANs that have a favorable atmospheric path to/from the satellite, signals that are received/transmitted by the satellite through one of several optical receivers/transmitters can be directed to one of several antennas for transmission to a selected user beam coverage area. The combination of flexibility in determining the source from which optical signals can be received on the optical uplink and the ability to select the particular antenna through which signals received from the source will be transmitted allows the system to mitigate the negative impact of the variable atmospheric conditions between the SANs and the satellite.

As disclosed herein, at least three different techniques that can be used to communicate information from SANs through a satellite to user beam coverage areas in which user terminals may reside. Three such techniques will now be described. A very brief summary of each is provided, followed by a more detailed disclosure of each architecture.

Briefly, the first technique uses a binary modulated optical signal on the uplink. Several SANs each receive information to be transmitted to user terminals that reside within user beam coverage areas. The optical signal is modulated with digital information. In some embodiments, each SAN transmits such a binary modulated optical signal to the satellite. The digital information may be a representation of information intended to be transmitted to a user beam coverage area in which user terminals may reside. The signal is detected in the satellite using an optical detector, such as a photodiode. In some embodiments, the resulting digital signal is then used to provide binary encoding, such as binary phase shift keying (BPSK) modulate an intermediate frequency (IF) signal. The IF signal is then upconverted to a satellite RF downlink carrier frequency. Modulating the RF signal with BPSK can be done relatively simply where the size, power, and thermal accommodation on the satellite is small. However, using BPSK as the baseband modulation for the RF signal on the user downlink 114 may not provide the maximum capacity of the system. That is, the full potential of the RF user downlink 114 is reduced from what it may be possible if a denser modulation scheme is used, such as 16 QAM instead of BPSK on the RF user downlink 114.

The second technique also modulates the optical signal on the uplink using a binary modulation scheme. The modulated optical signal is detected by a photodiode. The resulting digital signal is coupled to a modem. The modem encodes the digital information onto an IF signal using a relatively bandwidth efficient modulation scheme, such as quadrature amplitude modulation (QAM). QAM is used herein to refer to modulation formats than encode more than 2 bits per symbol, including for example quadrature phase shift keying (QPSK), offset QPSK, 8-ary phase shift keying, 16-ary QAM, 32-ary QAM, amplitude phase shift keying (APSK), and related modulation formats. While the use of the denser QAM scheme provides a more efficient use of the RF user link, using such encoding on the RF user downlink 114 requires a relatively complex digital/intermediate frequency (IF) conversion block (e.g., modem). Such complexity increases the size, mass, cost, power consumption and heat to be dissipated.

The third technique uses an RF modulated optical signal (as opposed to the binary modulated optical signals of the first two techniques). In this embodiment, rather than modulating the optical signal with digital information to be transmitted to the user beam coverage area, an RF signal is directly modulated (i.e., intensity modulated) on to the optical carrier. The satellite then need only detect the RF modulated signal from the optical signal (i.e., detect the intensity envelope of the optical signal) and frequency upconvert that signal to the user downlink frequency, relieving the satellite of the need for a complex modem. The use of an RF modulated optical signal increases the overall capacity of the communications system by allowing a denser modulation of the user link RF signal, while reducing the complexity of the satellite. Due to the available bandwidth in the optical signal, many RF carriers can be multiplexed onto an optical carrier. However, optical signals that are intensity modulated with an RF signal are susceptible to errors due to several factors, including fading of the optical signal.

Each of these three techniques suffer from the fact that there is an unreliable optical channel from the SANs to the satellite. Therefore, three system architectures are discussed to mitigate the problems of unreliable optical feeder link channels. In each configuration, additional SANs are used to offset the inherent unreliability of the optical links to the satellite. Signals can be routed from any of the SANs to any of the user beam coverage areas. Using additional SANs ensures that a desired number of SANs that have a high quality optical link to the satellite are available. Furthermore, flexibility in the routing through the satellite (i.e., referred to herein as "feeder link diversity") allows data to be transmitted from those SANs that have the desired quality optical channel to the satellite on the feeder link and to user spot beams on the user link in a flexible way.

Each of these three techniques will now be discussed in detail. Each of these techniques are discussed in the context of embodiments that have a particular number of components (i.e., SANs, lasers per SAN, transponders within the satellite, etc.). However, such specific embodiments are provided merely for clarity and ease of the discussion. Furthermore, a wide range of IF and/or RF frequencies, optical wavelengths, numbers of SANs, numbers of transponders on the satellite, etc. are within the scope of the disclosed embodiments. Therefore, the particular frequencies, wavelengths, antenna array elements, and numbers of similar parallel channels, components, devices, user beam coverage areas, etc. should not be taken as a limitation on the manner in which the disclosed systems can be implemented, except where expressly limited by the claims appended hereto.

Figure 4:
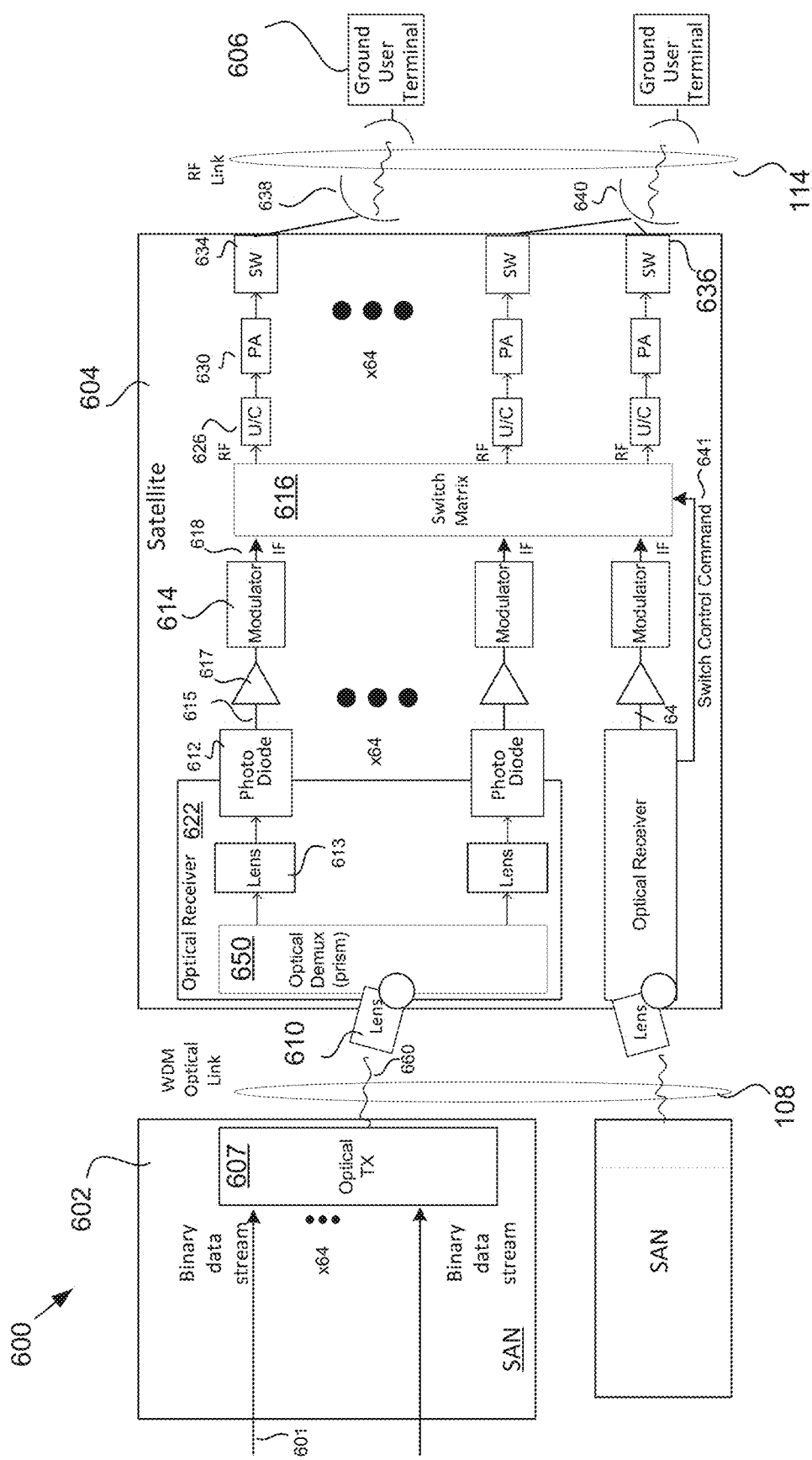
FIG. 4 is a simplified schematic of an example of a first of the three system architectures in which an optical link is used to communication on the feeder link.

FIG. 4 is a simplified schematic of a first of the three techniques noted above. A system 600 for implementing the first technique includes a plurality of SANs 602, a satellite 604 with at least one single-feed per beam antenna 638, 640 and a plurality of user terminals 606 within user beam coverage areas 1801 (see FIG. 19). Alternatively, any antenna can be used in which the antenna has multiple inputs, each of which can receive a signal that can be transmitted in a user spot beam to a user beam coverage area, such as direct radiating antennas, etc. The antennas 638, 640 may be a direct-radiating array or part of a reflector/antenna system. In some embodiments, the system 600 has M SANs 602. In the example system 600 and for each of the example systems discussed throughout this disclosure, M=8. However, none of the systems disclosed here should be limited to this number. M=8 is merely a convenient example, and in other embodiments, M can be equal to 2, 4, 10, 12, 16, 20, 32, 40, or any other suitable value. In some embodiments, the SANs 602 receive "forward traffic" to be communicated through the system from a source (such as a core node, not shown), which may receive information from an information network (e.g., the Internet). The data communicated to a SAN 602 from the core node can be provided in any form that allows for efficient communication of the data to the SAN 602, including as a binary data stream. In some embodiments, data is provided as a binary data stream modulated on an optical signal and transmitted to the SAN on an optical fiber. Forward traffic is received in streams that are identified with a particular user beam coverage area 1801. In some embodiments, the data may also be associated with a particular user terminal or group of user terminals to which the data is to be transmitted. In some embodiments, the data is associated with a terminal based on the frequency and/or timing of the signal that carriers the data. Alternatively, a data header or other identifier may be provided with the data or included in the data or in the data.

Once received, the forward traffic is a binary data stream 601. That is, in some embodiments, the forward traffic is a binary representation, such as an intensity modulated or phase modulated optical signal. In alternative embodiments, the forward traffic can be decoded into any other binary representation.

Figure 5:
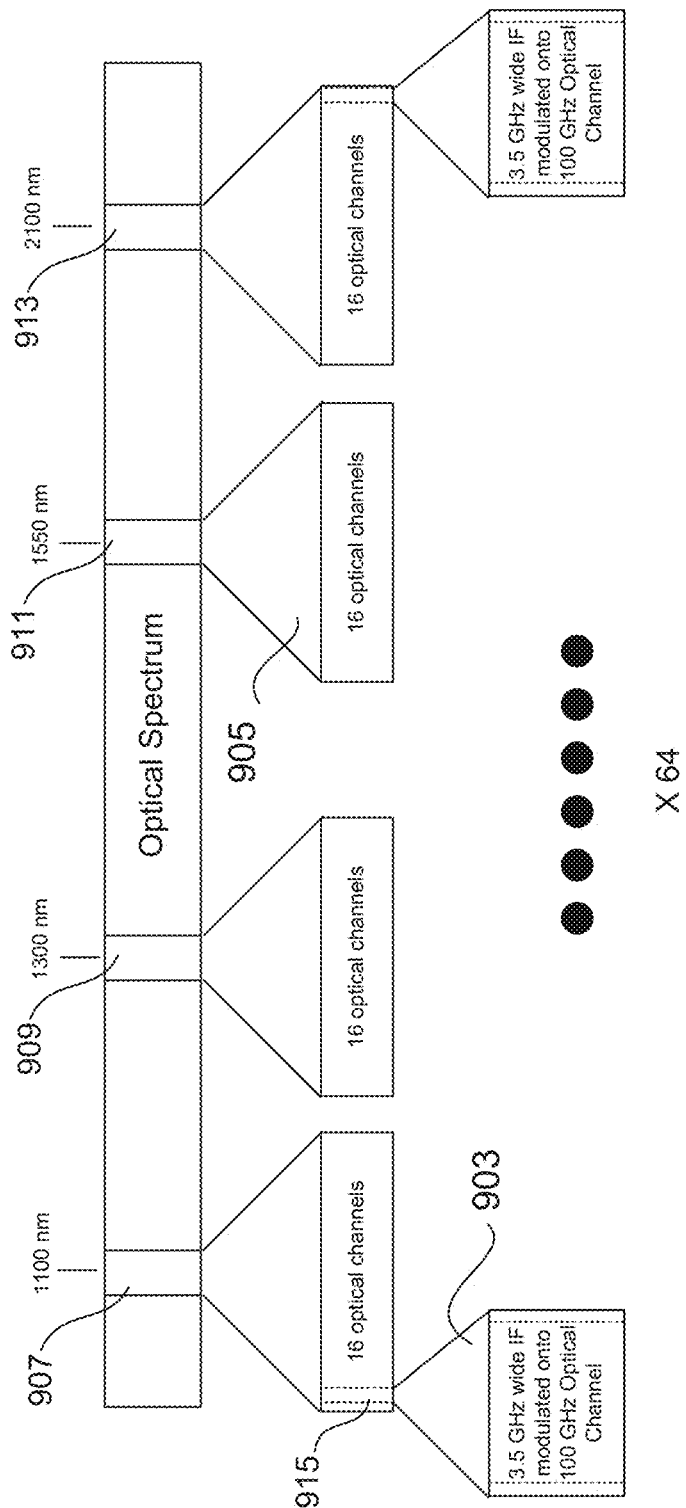
FIG. 5 shows an example of the relationship of IF signals, optical channels and optical bands used by the system in some embodiments.

FIG. 5 shows the relationship of IF signals 903, optical channels 915 and optical bands 907, 909, 911, 913 used by the system in some embodiments. The particular selection of bandwidths, frequencies, quantities of channels and wavelengths are merely examples provided to make disclosure of the concepts easier. Alternative modulation schemes can be used, as well as other optical wavelengths, quantities of channels and other RF and/or IF bandwidths and frequencies. The scheme shown is merely provided to illustrate one particular scheme that might be used. As shown, a plurality of 3.5 GHz wide binary modulated IF signals (e.g. 64) 903 carry binary data to be transmitted in one user spot beam. Examples of other bandwidths that can be used include 500 MHz, 900 MHz, 1.4 GHz, 1.5 GHz, 1.9 GHz, 2.4 GHz, or any other suitable bandwidth.

The binary (i.e., digital) content modulated onto each 3.5 GHz wide binary modulated IF signal 903 is used to perform binary intensity modulation of one of 16 optical channels within one of 4 optical bands 905. In some embodiments, the four bands 907, 909, 911, 913 of the optical spectrum are 1100 nm, 1300 nm, 1550 nm and 2100 nm. However, bands may be selected that lie anywhere in the useful optical spectrum (i.e., that portion of the optical spectrum that is available at least minimally without excessive attenuation through the atmosphere). In general, optical bands are selected that have no more attenuation than bands that are not selected. That is, several optical bands may have less attenuation then the rest. In such embodiments, a subset of those optical bands are selected. Several of those selected bands may exhibit very similar attenuation.

In one example, each optical channel is defined by the wavelength at the center of the channel and each optical channel is spaced approximately 0.8 nm apart (i.e., 100 GHz wide). While the RF signal 903 that is modulated onto the optical channel is only 3.5 GHz wide, the spacing allows the optical signals to be efficiently demultiplexed. In some embodiments, each SAN 602 wavelength division multiplexes (WDM) several (e.g., 64) such 3.5 GHz optical signals 903 (i.e., 4×16) together onto an optical output signal. Accordingly, the digital content of 64 optical channels can be sent from one SAN 602.

Figure 6:
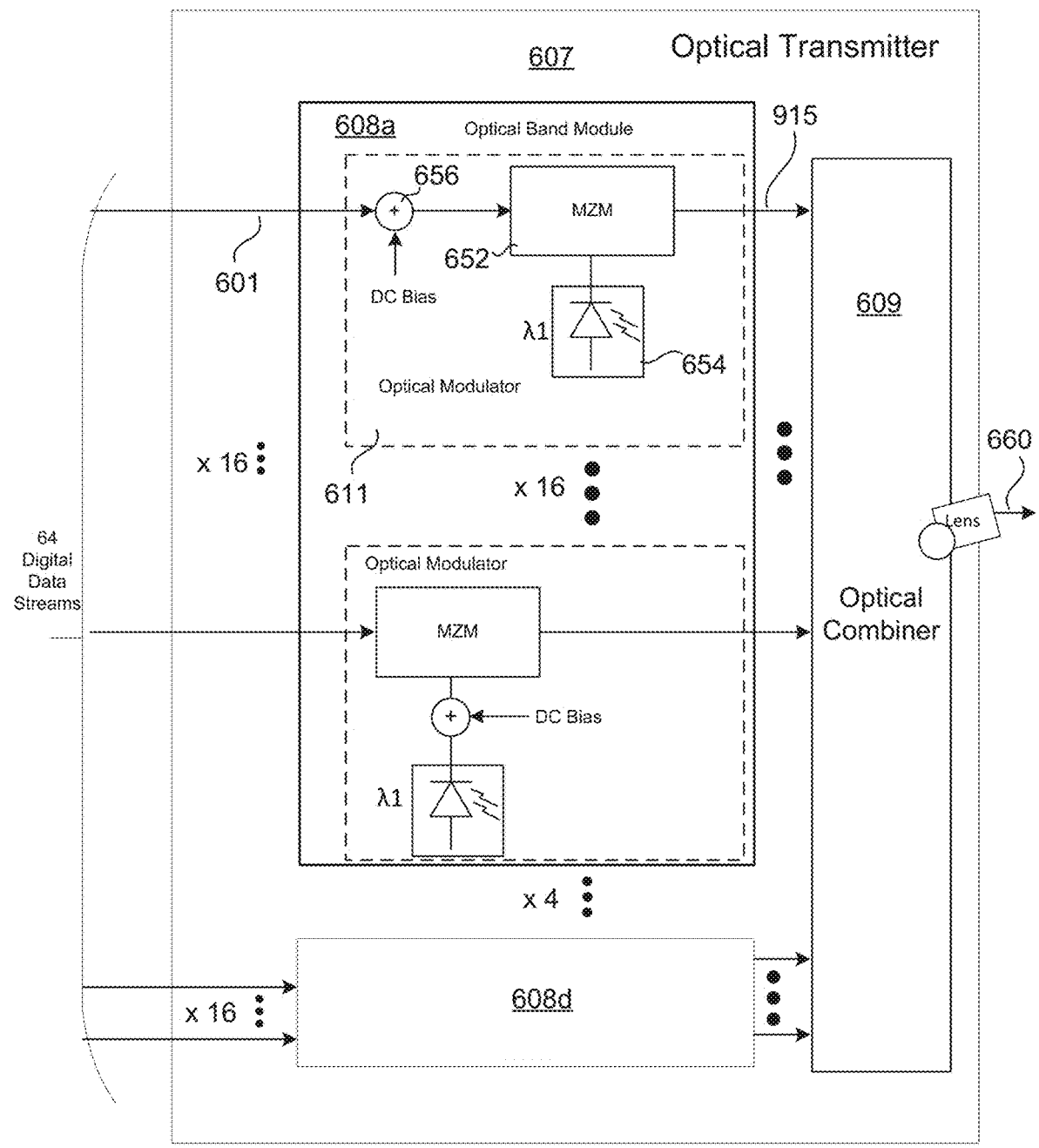
FIG. 6 shows an example of an optical transmitter used to perform the optical modulation of the binary data stream onto the optical signals.

FIG. 6 shows an optical transmitter 607 used to perform the optical modulation of the binary data stream 601 onto the optical signals. In accordance with the embodiment that implements the scheme shown in FIG. 5, the optical transmitter 607 includes four optical band modules 608a-608d (two shown for simplicity) and an optical combiner 609. Each of the 4 optical band modules 608 include 16 optical modulators 611 (two shown for simplicity) for a total of 64 modulators 611. Each of the 64 modulators 611 output an optical signal that resides in one of 64 optical channels 915 (see FIG. 5). The channels are divided into 4 optical bands 907, 909, 911, 913.

The modulator 611 determines the optical channel 915 based on the wavelength k 1 of a light source 654 that produces an optical signal. An MZM 652 intensity modulates the output of the first light source 654 with an intensity proportional to the amplitude of the binary data stream 601. The binary data stream 601 is summed with a DC bias in a summer 656. Since the binary data stream 610 is a digital signal (i.e., having only two amplitudes), the resulting optical signal is a binary modulated optical signal. The modulated optical output from the MZM modulator 652 is coupled to an optical combiner 609. For a system using a modulation scheme such as the one illustrated in FIG. 5, each of the 16 light sources 654 that reside within the same optical band module 608 output an optical signal at one of 16 different wavelengths λ1. The 16 wavelengths correspond to the 16 optical channels 915 within the first optical band 907. Likewise, the light sources 654 in the optical modulators 611 in each other optical band module 608 output an optical signal having a wavelength of λ1 equal to the wavelength of the channels in the corresponding optical band 909, 911, 913. Accordingly, the 64 optical outputs 915 from the four optical band modules 608a-608d each have a different wavelength and fall within the 16 optical channels of the four bands that are defined by the wavelengths λ1 of signals generated by the 64 light source 654. The optical combiner 609 outputs a wavelength division multiplexed (WDM) optical signal 660 that is the composite of each signal 915.

The SAN 602 sends the optical signal 660 to the satellite 604 over an optical feeder uplink 108 (see FIG. 4). The optical signal emitted by the optical transmitter 607 is received by a lens 610 in the satellite 604. In some embodiments, a lens 610 is part of a telescope within the optical receiver 622. In some embodiments, the lens 610 is steerable (i.e., can be directed to point at any one of several SANs 602 within the system or any one from within a subset). By allowing the lenses 610 to be pointed to more than one of the SANs 602, the lens 610 can be pointed to a SAN 602 having an optical path to the satellite that is not currently subject to signal fading. The lens 610 may be pointed using mechanical 2-axis positioning mechanisms. Pointing of the lens may be accomplished by measuring the receive signal strength of a signal transmitted over the optical channel and using the signal strength to identify when the lens is pointed at a SAN with an optical link of sufficient quality (i.e., above a desired quality threshold). Either ground commands or on-board processing may provide directions to the lens positioning mechanisms to correctly point the lens 610 at the desired SAN 602.

The optical receiver 622 further includes an optical demultiplexer 650, such as a filter or prism. The optical receiver 622 has a plurality of outputs, each output corresponding with an optical wavelength. As shown in FIG. 4, the optical receiver 622 has 64 outputs. However, as noted above, the particular frequency, number of optical bands and wavelength selection, and thus the number of outputs from the optical receiver 622, are provided herein merely as an example and are not intended to limit the systems, such as system 600, to a particular number.

In some embodiments, each wavelength resides within one of the four optical bands 907, 909, 911, 913. Each optical wavelength is at the center of an optical channel. Optical channels within one band are spaced approximately 0.8 nm (i.e., 100 GHz) apart. Making the optical channels spacing wide makes it easier to provide an optical demultiplexer 650 that can demultiplex the optical signal to provide each of the 64 optical channels on a separate output. In some embodiments, an additional lens 613 is provided to focus the output of the optical demultiplexer 650 into the input of an optical detector, such as a photodiode 612. The photodiode 612 generates an electrical signal by detecting the intensity envelope of the optical signal 660 presented at an optical input to the photo diode. In some embodiments in which the optical signal 660 was intensity modulated to one of two intensity levels, the first intensity level representing a logical "1" results in an electrical signal having a first amplitude which also represents a logical "1". A second intensity level representing a logical "0" results in an electrical signal an amplitude representing a logical "0". Therefore, the electrical signal is placed in a first state when the intensity of the optical signal 660 is in a state representing a logical "1" and placed in a second state when the intensity of the optical signal 660 is in a state representing a logical "0". Accordingly, the optical receiver has a plurality of digital outputs 615. The electrical signal output from the digital output 615 of the photodiode 612 is coupled to a modulator 614, such as a bi-phase modulator. In some embodiments, such as the embodiment of FIG. 4, an LNA 617 is provided between the photo diode 612 and the bi-phase modulator 614. The output of the bi-phase modulator 614 is a BPSK modulated IF signal (i.e., analog signal) having two phases. The BPSK modulator 614 outputs a signal having a first phase representing a logical "1" in response to the electrical input signal at the first amplitude (i.e., in the first state). When the input to the modulator 614 has an amplitude representing a logical "0" (i.e., the second state), the phase of the output of the BPSK modulator 614 is shifted to a second phase different from the first phase. The output of the modulator 614 is coupled to the input of a switch matrix 616.

In the simplified schematic of FIG. 4, a second SAN 602, lens 610, optical receiver 622 and plurality of bi-phase modulators 614 (i.e., 64) are coupled to the switch matrix 616. While only two SANs 602 are shown in FIG. 4, it should be understood that the satellite may receive optical signals from several SANs 602 (e.g., 8).

In some embodiments, the switch matrix 616 shown in FIG. 4 has a plurality of (e.g., 64) inputs for each lens 610. That is, if the satellite 604 has 8 lenses 610, the matrix switch 616 has 512 inputs, each coupled to one of the modulators 614. The switch matrix 616 allows signals at the outputs of the switch matrix 616 to be selectively coupled to inputs of the switch matrix 616. In some embodiments, any input can be coupled to any output. However, in some embodiments, only one input can be coupled to any one output. Alternatively, the inputs and outputs are grouped together such that inputs can only be coupled to outputs within the same group. Restricting the number of outputs to which an input can be coupled reduces the complexity of the switch matrix 616 at the expense of reduced flexibility in the system.

The outputs of the switch matrix 616 are each coupled to an upconverter 626. The upconverter 626 upconverts the signal to the frequency of the user downlink carrier. For example, in some embodiments, the signal output from the switch matrix 616 is a 3.5 GHz wide IF signal. The 3.5 GHz wide IF signal is upconverted to an RF carrier having a 20 GHz center frequency. The output of each upconverter 626 is coupled to a corresponding power amplifier 630. The output of each amplifier 630 is coupled to one of a plurality of antenna input, such as a inputs (e.g., antenna feeds not shown) of one of the antennas 638, 640. Accordingly, each of the outputs of the switch matrix 616 is effectively coupled to a corresponding one of the antenna inputs. In some embodiments, each input of each antenna 638, 640 transmits a user spot beam to one user beam coverage area 1801 (see FIG. 19). The switch matrix 616 is capable of selecting which input (i.e., bi-phase modulator 614) is coupled to which output (i.e., upconverter 626). Accordingly, when (or before) the signal from one of the SANs 602 fades and errors become intolerable, the switch matrix 616 can couple the input of the upconverter 626 (i.e., the associated antenna feed) to a SAN 602 that is sending an optical signal that is not experiencing significant fading. In some embodiments, the switch matrix 616 allows the content that is provided to the antenna inputs to be time division multiplexed so that content from a particular SAN can be distributed to more than one user spot beam (i.e., antenna feed).

That is, when each lens 610 is receiving a signal from the SAN 602 to which it is pointing, each of the 64 outputs from the optical receiver 622 associated with that Lens 610 will have a signal. In the embodiment in which each antenna input to the antennas 638, 640 transmits a user spot beam to a particular user coverage area 1801, all of the user coverage areas 1801 will receive a signal (assuming the switch matrix 616 is mapped to couple each input to one output). The switch matrix 616 selects which analog output from the bi-phase modulator 614 is to be coupled to each antenna input (e.g., transmitted to each feed of the single-feed per beam antenna 638, 640) (i.e., in each user spot beam). However, when the optical signal from a particular SAN 602 fades, a signal is still provided to all of the antenna inputs to ensure that no user coverage areas 1801 loses coverage. Time multiplexing the signals from one SAN to more than 64 antenna inputs allows one SAN 602 to provide signals to more than 64 user coverage areas 1801. While the total capacity of the system is reduced, the availability of the system to provide each user coverage area with content is enhanced. This is beneficial in a system with an optical feeder link. In some embodiments, such time multiplexing is done for a short time while the lens 610 that is directed to a SAN 602 that has a weak optical link is redirected to another SAN to which there is a stronger optical link. More generally, the matrix 616 can be used to time multiplex analog signals output from the optical receiver 622 to more than one user spot beam, such that during a first period of time the analog signal is coupled to a first antenna input (e.g., feed) transmitting a user spot beam directed to a first user beam coverage area. During a second period of time, the analog signal is coupled to a second antenna input (e.g., feed) transmitting a user spot beam directed to a second user beam coverage area.

Once each lens 610 is receiving a sufficiently strong optical signal, the switch matrix 616 can again map each output to a unique output in a one-to-one correspondence of input to output. In some such embodiments, control of the switch matrix 616 is provided by a telemetry signal from a control station. In most embodiments, since all 64 of the IF signals from the same SAN 602 will degrade together, the switch matrix 616 need only be able to select between K/64 outputs, where K is the number of user spot beams and 64 is the number of photo diodes 612 in one optical receiver 622. As noted above, the process of controlling the routing through the satellite to map SANs 602 to user spot beams is referred to herein as feeder link diversity. As will be discussed below, feeder link diversity can be provided in three different ways.

In some embodiments, the satellite 604 has more antenna inputs than transponders (i.e., paths from the optical receiver to the switches 634, 636). That is, a limited number of transponders, which include power amplifiers (PAs) 630, upconverters 626, etc., can be used to transmit signals to a relatively larger number of user beam coverage areas. By sharing transponders among antenna inputs, the output from each photo diode 612 can be time multiplexed to service a number of user beam coverage areas that is greater than the number of transponders provided on the satellite 604. In this embodiment, RF switches 634 are used to direct the output of the PA 630 to different inputs of the one or both of the antennas 638, 640 at different times. The times are coordinated so that the information present on the signal is intended to be transmitted to the user beam coverage area to which the input is directed (i.e., the feed is pointed). Accordingly, one transponder can be used to provide information to several user beam coverage areas in a time multiplexed fashion. By setting the switches 634, 636 to direct the signal to a particular antenna 638, 640, the signal received by each of the lenses 610 can be directed to a particular spot beam. This provides flexibly in dynamically allocating capacity of the system.

The switches 634, 636 direct the signal to inputs of any of the antennas 638, 640 mounted on the satellite. In some embodiments, the output from the switches 634, 636 may be directed to a subset of the antennas. Each antenna 638, 640 is a single-feed per beam antenna directed to a particular user beam coverage area, thereby producing a spot beam. In alternative embodiments, the PAs 630 may be directly connected to the antenna inputs, with the matrix switch 616 determining which of the signals detected by each particular photo diodes 612 will be transmitted to which of the user beam coverage areas. In addition, even in embodiments in which there are an equal number of satellite transponders and antenna inputs, having switches 634, 636 can reduce the complexity of the switch matrix 616. That is, using a combination of the switch matrix 616 and switches 634, 636, the switch matrix 616 need not be capable of coupling each input to each output. Rather, the matrix inputs, outputs and antenna inputs can be grouped such that any input of a group can be coupled only to any output of that same group. The switches 634, 636 can switch between antenna inputs (e.g., feeds) to allow outputs of one group to be coupled to an antenna input of another group.

The switch matrix 616 may be operated statically or in a dynamic time division multiple access mode. In the static mode of operation, the configuration of the paths through the switch matrix 616 essentially remains set for relatively long periods of time. The configuration of the switch matrix 616 is only changed in order to accommodate relatively long-term changes in the amount of traffic being transmitted, long term changes in the quality of a particular link, etc. In contrast, in a dynamic time division multiple access mode, the switch matrix 616 is used to time multiplex data between different forward downlink antenna inputs. Accordingly, the switch matrix 616 selects which inputs to couple to the output of the switch matrix 616. This selection is based on whether the input signal is strong enough to ensure that the number of errors encountered during demodulation of the signal at the user terminal 842, 844 is tolerable. In some such embodiments, time multiplexing the analog outputs of the optical receiver 622 to different antenna inputs allows one SAN 602 to service more than one user beam coverage area. During a first period of time, one or more signals output from an optical receiver 622 can each be coupled through to a unique one of a first set of antenna inputs (i.e., directed to a unique one of a first set of user beam coverage areas). During a second period of time, one or more of those same signals can be coupled through to different antenna inputs (i.e., different user beam coverage areas). Such time multiplexing of the analog outputs 615 from the optical receiver 622 can be performed in response to one of the lens 610 of an optical receiver 622 pointing to a "weak" SAN 602 (i.e., a SAN 602 having an optical link that is below a quality threshold). In such a embodiment, a first data stream initially set to the weak SAN 602 can be redirected by the core node to a "strong" SAN 602 (i.e., a SAN 602 having an optical link that is above the quality threshold). The strong SAN 602 time multiplexes that information such that for a portion of the time the strong SAN 602 transmits information directed to a first set of user beam coverage areas to which the first data stream is intended to be sent. During a second period of time, the strong SAN 602 transmits a second data stream directed to a second set of user beam coverage areas. Accordingly, during one period of time, information that would have been blocked from reaching the satellite 604 by the poor optical link between the weak SAN 602 and the satellite 604 can be transmitted to the satellite 604 through the strong SAN 602. During this time, the lens 610 that is pointing at the weak SAN 602 can be redirected to point to a strong SAN 602 that is not already transmitting to the satellite 604. As noted above, this process of redirecting information from a weak SAN to a strong SAN is an aspect of feeder link diversity.

By determining when a feeder uplink signal is experiencing an unacceptable fade, data can be routed away from the SAN 602 that is using the failing feeder uplink and to a SAN 602 that has a feeder uplink signal that has an acceptable signal level. By the process of feeder link diversity, the signal transmitted through the selected SAN 602 can then be routed through the switch matrix 616 to the spot beam to which data is intended to be sent.

The system 600 has the advantage of being relatively simple to implement within the satellite 604. Conversion of binary modulated optical data to a BPSK modulated IF signal using photodiodes 612 and bi-phase modulators 614 is relatively simple. Such bi-phase modulators are relatively easy and inexpensive to build, require relatively little power and can be made relatively small and lightweight. However, using BPSK modulation on the RF user downlink 114 is not the most efficient use of the limited RF spectrum. That is, greater capacity of the RF user downlink 114 (see FIG. 1) can be attained by using a denser modulation scheme, such as 16 QAM instead of BPSK on the RF user downlink 114.

For example, in an alternative embodiment of the system 600 that implements the second of the three techniques noted above, the analog signal 618 that is to be transmitted on the user downlink is modulated with a denser modulation scheme. Generating the complex modulation on the analog signal 618 requires that the modulator be a very complex modulator that takes the digital data stream and converts the data stream to one or more complex modulated signals. The complex modulated signal 618 can be a high order modulation such as 64-QAM, 8psk, QPSK for example. Alternatively, any other modulation scheme can be used that is capable of modulating symbols onto an IF carrier, where the symbols represent more than two logical states. That is, the binary intensity modulation of the optical signal results in the output 615 of the optical receiver 622 providing an electronic signal that has binary modulation representing the underlying content. In order to modulate the analog signal 618 with a more complex modulation scheme, such as 16 QAM, the modulator 614 is a QAM modulator and thus perform QAM modulation of the IF signal based on the digital content output from the photodiode 612.

Accordingly, in some embodiments, the bi-phase modulator 614 of the system 600 is replaced with a QAM modulator 614 (i.e., a modulator in which each symbol represents more than 2 bits). Accordingly, rather than limiting the modulation of the IF signals 618 to a binary modulation scheme (i.e., two logical states), such as BPSK, the modulator 614 allows the IF signals 618 to be modulated with a denser modulation scheme (i.e., schemes in which symbols are capable of representing more than two values, such as QAM). While the more complex QAM modulator provides a more efficient modulation of the IF signals 618 (QAM verses BPSK), it is more complex, requires more power, is heavier and more expensive than a bi-phase modulator.

Figure 7:
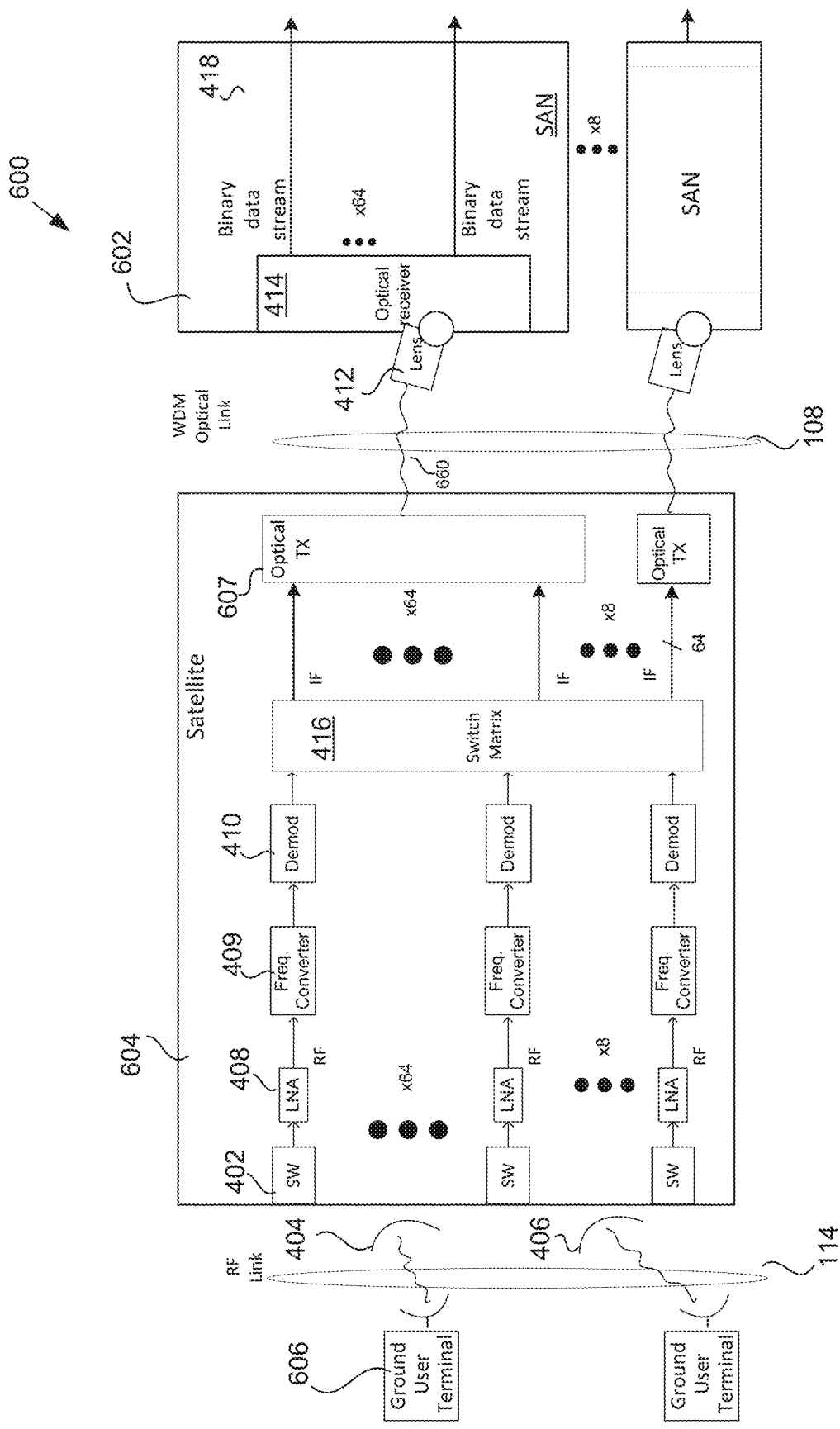
FIG. 7 is an illustration of an example of the return path for the system of FIG. 4.

FIG. 7 is an illustration of the return path for the system 600. User terminals 606 transmit a binary modulated signal to the satellite 604. Switches 402 coupled to each element of the antenna (e.g., single beam per feed antennas 404, 406) select between satellite transponders comprising a Low noise amplifier (LNA) 408, frequency converter 409 and digital decoder 410. The frequency converter 409 down converts the received signal from the user uplink frequency to IF. The decoders 410 decode the binary modulation on the received IF signal. Accordingly, the output of each decoder 410 is a digital signal. The digital decoders 410 are coupled to inputs to a switch matrix 416. The switch matrix 416 allows signals that are received over each of the user spot beams to be modulated on different optical links (i.e., transmitted to different SANs 602) depending upon whether there is significant fading on the optical downlink to each SAN 602. The outputs of the switch matrix 416 are coupled to inputs to optical transmitters 607. Each optical transmitter 607 is essentially identical to the optical transmitter 607 shown in FIG. 6 and discussed above. In some embodiments in which the optical spectrum is used in essentially the same manner as used on the forward feeder link (see FIG. 5), each of four optical band modules 608 receive 16 outputs from the matrix switch 416 for a total of 64 inputs to the optical transmitter 607. In some embodiments in which the satellite can receive optical signals from 8 SANs 602, there are 8 such optical transmitters 607 that can receive a total of 512 outputs from the switch matrix 416. Each optical transmitter 607 outputs an optical signal 660. The optical signal 660 is receive by a lens 412 within an optical receiver 414 in a SAN 602. The optical receiver 414 and lens 412 are essentially identical to the optical receiver 622 and lens 610 within the satellite 604, as described above with reference to FIG. 4. Accordingly, the output of the optical receiver 414 is a binary data stream. The output of the optical receiver is sent to an information network, such as the network that provided forward traffic to the SAN 602.

In an alternative embodiment, the return link for the system 600, the modulation used on the return uplink from the user terminals 606 to the satellite 604 is a more efficient modulation scheme than binary modulation. Accordingly, the binary modulator 410 is a more complex modulator 410. The binary data output from the demodulator 410 is the result of decoding the modulated symbols modulated onto the IF signal by the user terminal 606. For example, if 16 QAM was used on the user uplink, then the signal output from the demodulator is a digital stream of values represented by 16 QAM symbol. The binary signal output from the converter 502 is coupled to an input to the switch matrix 416. Both the binary demodulator and the complex demodulator 410 output a digital data stream to be used to perform binary modulation of the optical signal transmitted on the feeder downlink by the optical transmitter 607.

Figure 8:
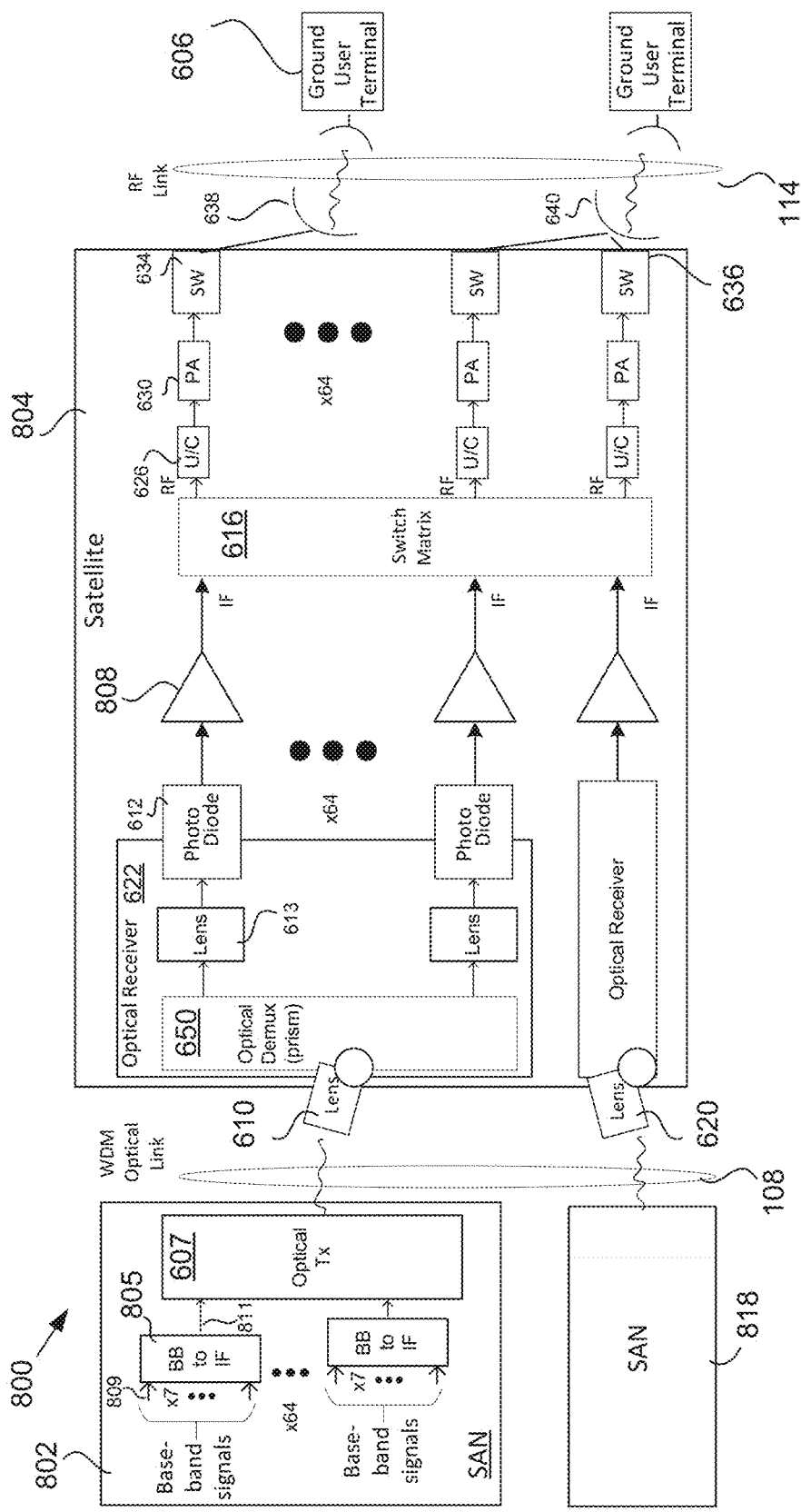
FIG. 8 is a simplified schematic of an example of a third system architecture in which an optical link is used to communicate on the feeder link.
Figure 9:
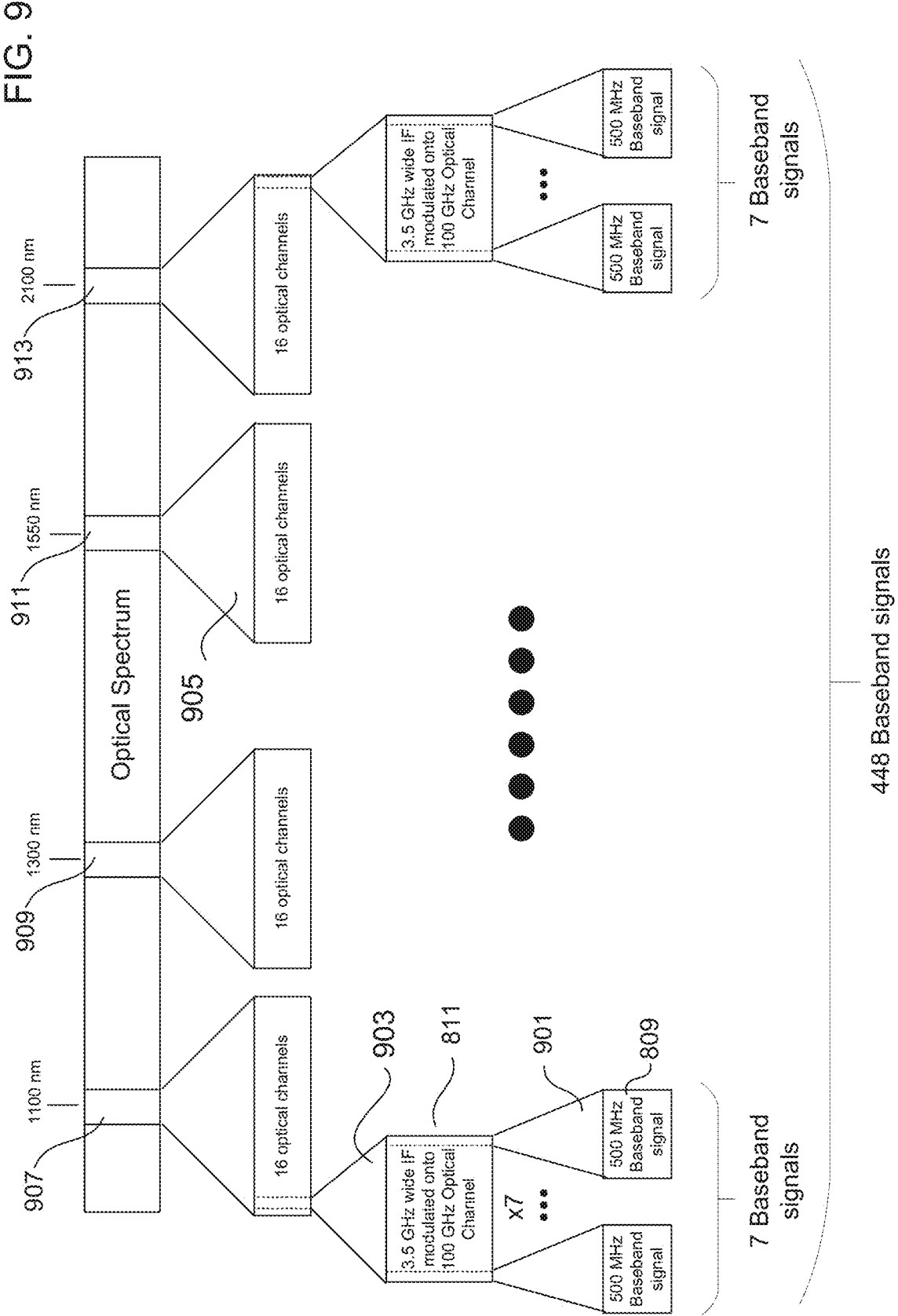
FIG. 9 is an illustration of an example of the relationship between sub-channels, carriers and optical signals within the system of FIG. 8.

FIG. 8 is a simplified schematic of a system 800 for implementing the third technique. In some embodiments of the system 800, a SAN 802 receives the forward traffic as "baseband" signals 809 that are coupled to the inputs of a baseband to IF converter 1605. In some embodiments, seven 500 MHz wide baseband sub-channels 809 are combined in a 3.5 GHz wide IF signal 811. Each of the 3.5 GHz wide signals 811 is transmitted to one user coverage area 1801. FIG. 9 illustrates the relationship between baseband sub-channels 809, IF signals 811 and optical signals within the system 800.

Examples of other bandwidths that can be used include 500 MHz (e.g., a single 500 MHz sub-channel), 900 MHz, 1.4 GHz, 1.5 GHz, 1.9 GHz, 2.4 GHz, or any other suitable bandwidth.

Figure 10:
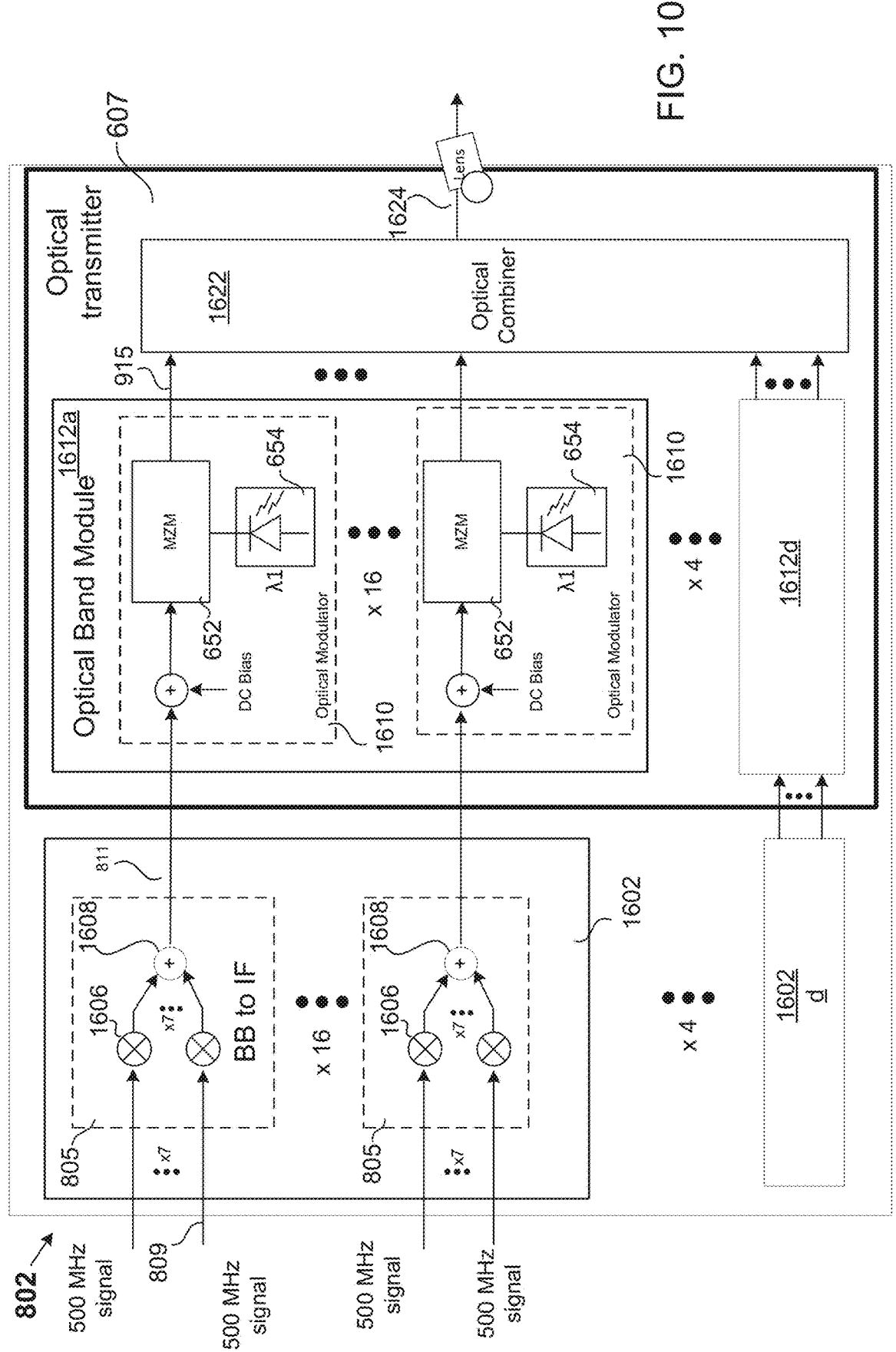
FIG. 10 is a simplified illustration of an example of a SAN.

FIG. 10 is a simplified illustration of a SAN 802, such as the SAN 802 shown in FIG. 8. In some embodiments, there are 64 baseband to IF converters 1605, shown organized in four IF combiners 1602, each comprising 16 converters 1605. Grouping of the baseband to IF converters 1605 within IF converters 1602 is not shown in FIG. 8 for the sake of simplifying the figure. Each of the 64 baseband to IF converters 1605 has S inputs, where S is the number of sub-channels 809. In some embodiments in which the sub-channel 809 has a bandwidth of 500 MHz and the signal 811 has a bandwidth of 3.5 GHz, S equals 7. Each input couples one of the sub-channels 809 to a corresponding frequency converter 1606. The frequency converters 1606 provide a frequency offset to allow a subset (e.g., S=7 in FIG. 10) of the sub-channels 809 to be summed in a summer 1608. Accordingly, in some embodiments, such as the one illustrated in FIG. 10, a SAN 802 processes 64 channels, each 3.5 GHz wide. In some embodiments, the 3.5 GHz wide signal can be centered at DC (i.e., using zero IF modulation). Alternatively, the signal 811 can be centered at a particular RF frequency. In one particular embodiment, an RF carrier 811 is centered at the RF downlink frequency (in which case the satellite will need no upconverters 626, as described further below). The output 811 from each summing circuit 1608 is an IF signal 811 that is coupled to one of 64 optical modulators 611. The 64 optical modulators 611 are grouped into 4 optical band modules 608. Each optical modulator 611 operates essentially the same as the optical modulator 611 shown in FIG. 6 and discussed above. However, since the input 811 to each optical modulator 608 is an analog signal, the optical signal output from each optical modulator 611 is an intensity modulated optical signal having an amplitude envelope that follows the amplitude of the IF signal 811.

An optical combiner 609 combines the outputs from each of the 64 optical modulators 611 to generate a wavelength division multiplexed (WDM) composite optical signal 1624. The number of baseband to IF converters 1605 and the number of optical modulators 611 in the optical band module 608 can vary. As shown in FIG. 9, the four optical modulators 611 can be designed to output optical signals having wavelengths centered at 1100 nanometers, 1300 nanometers, 1550 nanometers and 2100 nanometers.

In the system 800, the optical transmitter 607 (similar to the optical transmitter 607 of FIG. 4) emits an RF modulated composite optical signal 1624. The RF modulated composite optical signal 1624 is received within the satellite 804 by a lens 610 (see FIG. 8). The lens 610 can be directed to any of a plurality of SANs 802 capable of transmitting an optical signal to the satellite 804. The output of the lens 610 is coupled to the input of an optical detector, such as a photodiode 612 (e.g. a PIN diode). The photodiode 612 detects the envelope (i.e., the contour of the intensity) of the optical signal and converts the envelope of the optical signal to an electrical signal. Since the optical signal is intensity modulated with the IF signal 811, the resulting electrical signal output from the photodiode 612 is essentially the same as the IF signal 811 that was modulated by the SAN 802 onto the composite optical signal 1624. The photodiode 612 is coupled to an amplifier 808. The signal output from the amplifier 808 is then coupled to an input of a matrix switch 616. The matrix switch 616 performs in the same way as the matrix switch 616 discussed with respect to FIG. 4 above. Accordingly, the switch matrix 616 selects which inputs to couple to the output of the switch matrix 616. The output of the matrix switch 616 is handled the same as in the systems 600 described above in embodiments in which the signal 811 is at zero IF. In embodiments in which the signal 811 output from the baseband to IF module 607 within the SAN is at a frequency that is to be directly transmitted from the satellite 804, then the handling will be the same, but for the fact that the upconverters 626 are not required.

Figure 11:
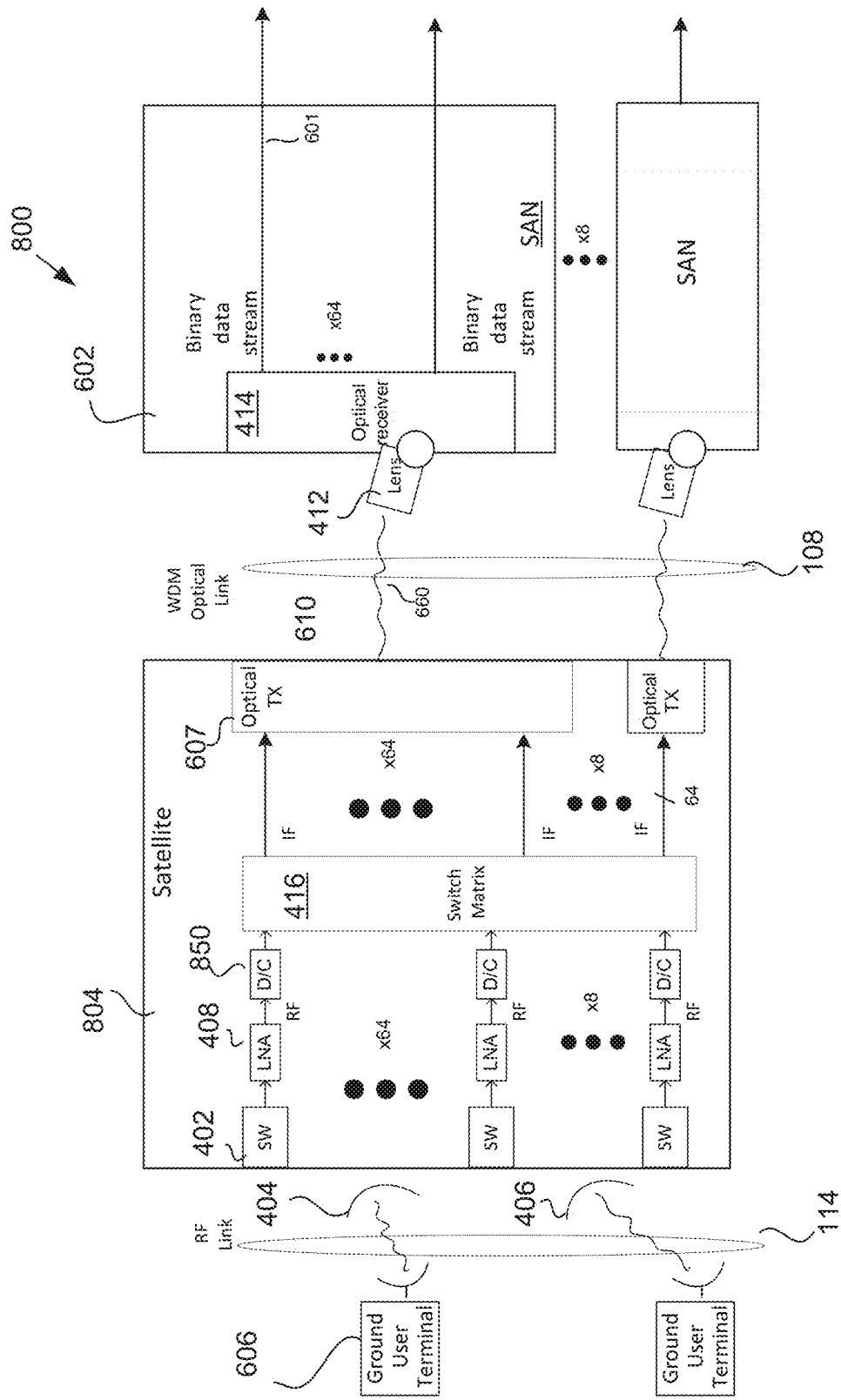
FIG. 11 is an illustration of an example of the return link for the system of FIG. 8.

FIG. 11 is an illustration of the return link for the system 800. The return link for the system 800 is essentially the same as shown in FIG. 7. However, rather than the user terminals 606 transmitting a signal having binary modulation, the user terminals 606 transmit a signal having a more efficient modulation (e.g., 16 QAM rather than QPSK). Accordingly, the output digital decoder 410 is not required. The downconverter 850 downconverts the RF frequency used on the user uplink to an appropriate IF frequency. In some embodiments, the IF frequency signal is a zero IF signal that is 3.5 GHz wide. The output of each downconverter 850 is coupled to an input of the switch matrix 416. Therefore, the inputs of the MZM modulator 652 (see FIG. 6) receive an analog signal from the switch matrix 416. Accordingly, the output of each optical modulator 611 is an intensity modulated optical signal in which the intensity envelope tracks the signal output from the downconverter 850. In some embodiments, the optical modulator 611 directly modulates the RF user uplink frequency onto the optical signal. Accordingly, the frequency converter 850 is not required. In embodiments in which the downconverter 850 reduces the user uplink frequency to a zero IF signal, the combined optical signal 660 is handled in the same way as discussed with regard to FIG. 7. In embodiments in which the optical signal is modulated with the user uplink frequency, a downconverter may be included within the modem 418 or prior to coupling the signal from the optical receiver 414 to the modem 418.

Having discussed the three different techniques for modulating signals on the feeder link, each of which use a first system architecture having a satellite that uses a matrix switch 616 to allow a flexible assignment of received carriers to user spot beams, a second and third system architectures are discussed. The second system architecture includes a satellite having on-board beam forming. The third system architecture uses ground-based beam forming.

Figure 12:
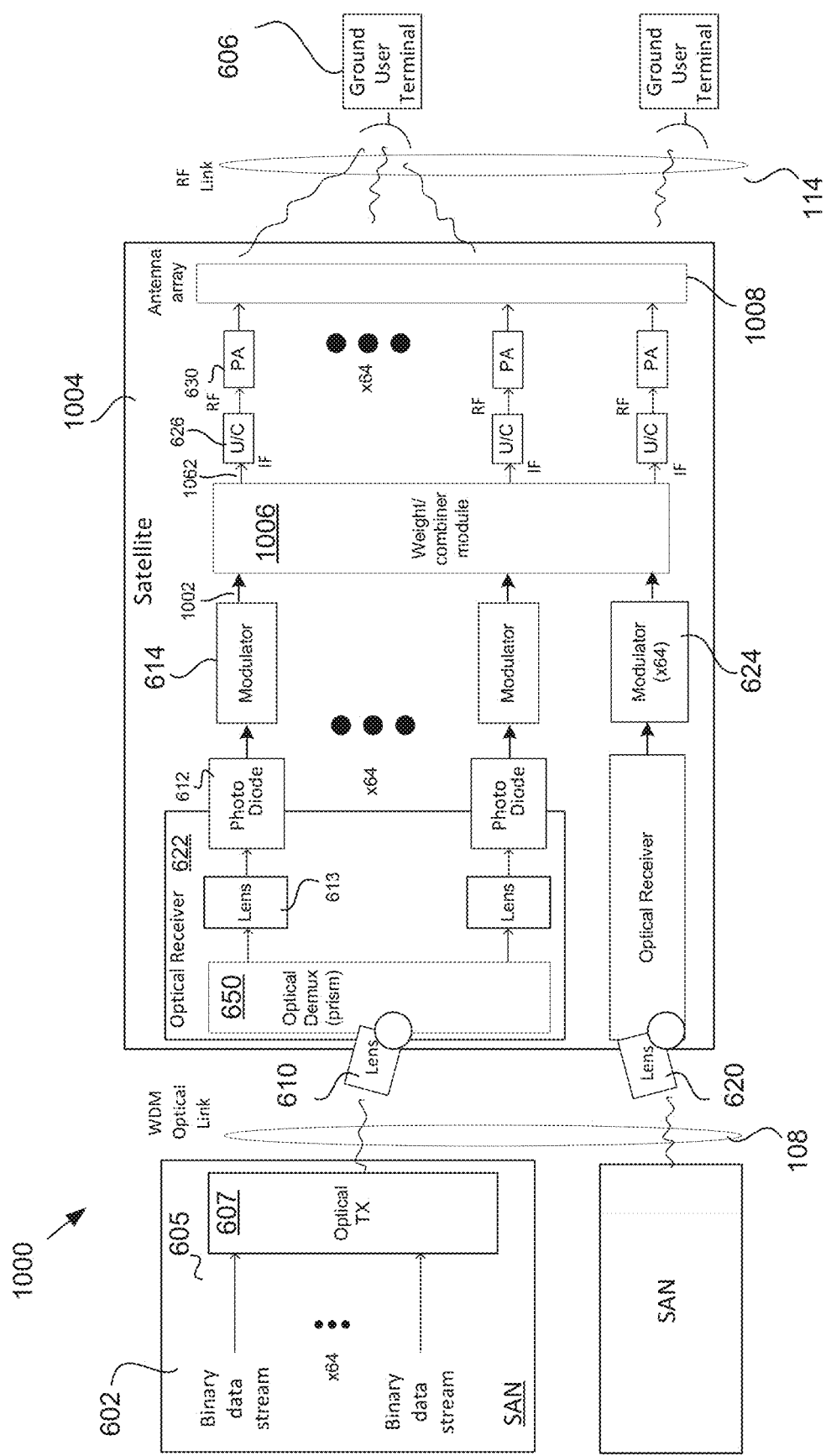
FIG. 12 is a simplified schematic of an example of a system architecture in which a satellite has on-board beamforming.

FIG. 12 is a simplified schematic of a system 1000 using the technique shown in FIG. 4 (i.e., modulating the optical feeder uplink with binary modulation and using that binary content to modulate an RF user downlink). However, the system 1000 uses the second system architecture in which a satellite 1004 is capable of performing on-board beamforming. The system 1000 operates similarly to the system 600 described above. However, the IF output from each bi-phase modulator 614 is coupled to a weight/combiner module 1006 rather than to the switch matrix 616.

Figure 13:
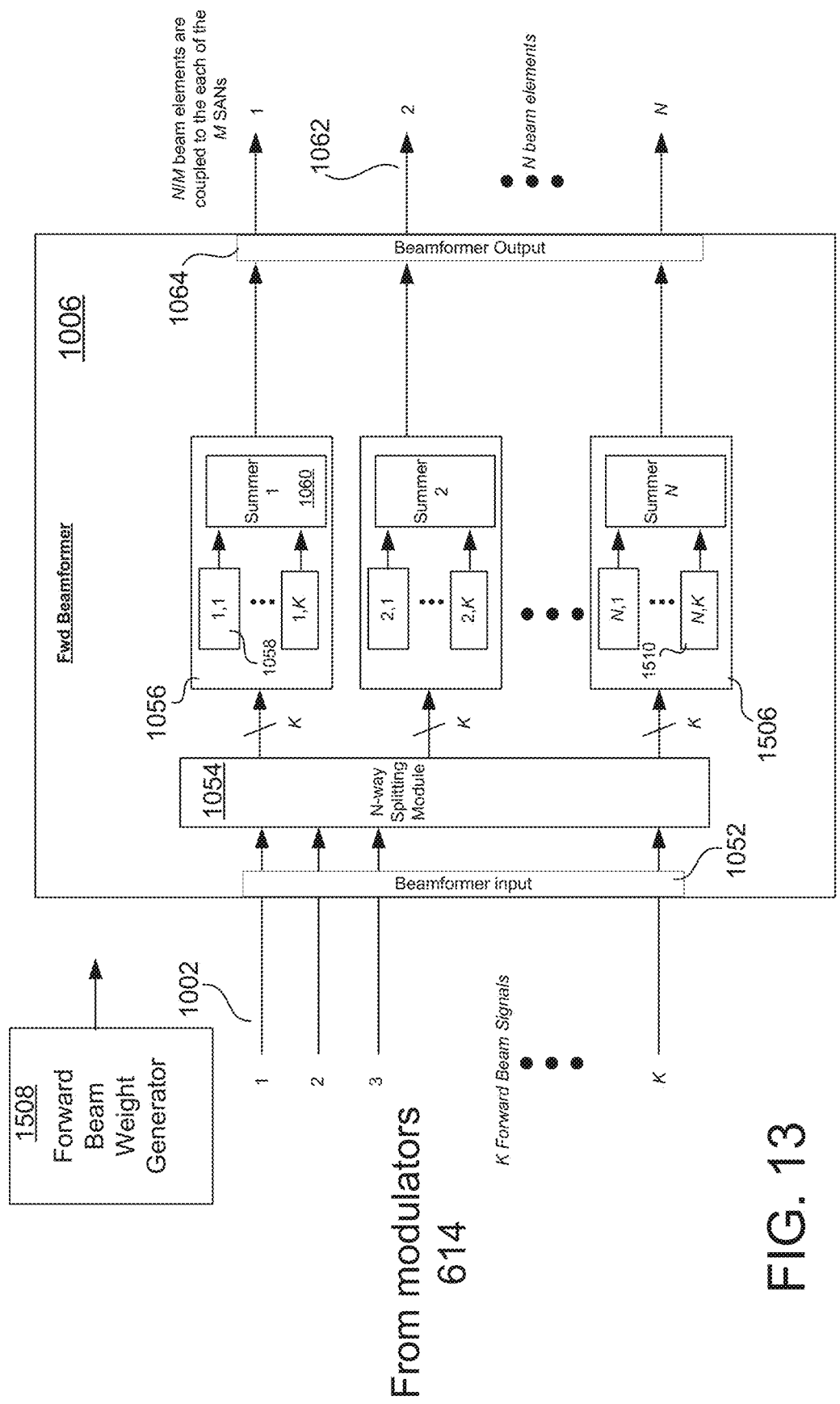
FIG. 13 is a simplified block diagram of an example of a weight/combiner module.

FIG. 13 is a simplified block diagram of a weight/combiner module 1006 in which K forward beam signals 1002 are received in the weight/combiner module 1006 by a beamformer input module 1052. The K signals 1002 are routed by the input module 1052 to an N-way splitting module 1054. The N-way splitting module 1054 splits each of the K signals 1002 into N copies of each forward beam signal, where N is the number of elements in the antenna array that is to be used to form K user spot beams.

In the example of the system described above with respect to FIG. 4, there are 8 active SANs, each transmitting an optical signal comprising 64 optical channels. Each of the 64 optical channels carries a 3.5 GHz IF signal (i.e., forward beam signal). Therefore, there are 512 forward beam signals (i.e., 8 SANs×64 IF signals). Accordingly K=512. In some embodiments, the satellite has an antenna array 1008 having 512 array elements. Accordingly, N=512.

Each output from the N-way splitting module 1054 is coupled to a corresponding input of one of 512 weighting and summing modules 1056. Each of the 512 weighting and summing modules 1056 comprises 512 weighting circuits 1058. Each of the 512 weighting circuits 1058 place a weight (i.e., amplify and phase shift) upon a corresponding one of 512 signals output from the N-way splitting module 1054. The weighted outputs from the weighting circuits 1058 are summed by a summer 1060 to form 512 beam element signals 1062. Each of the 512 beam element signals 1062 is output through a beamformer output module 1064. Looking back at FIG. 12, the 512 beam element signals 1062 output from the weight/combiner module 1006 are each coupled to a corresponding one of 512 upconverters 626. The upconverters 626 are coupled to PAs 630. The outputs of the PAs 630 are each coupled to a corresponding one of 512 antenna elements of the antenna array 1008. The antenna array can be any of: a direct radiating array (where each antenna element directly radiates in the desired direction), an array fed reflector (where each antenna element illuminates a reflector shared by all antenna elements), or any other suitable antenna configuration. The combination of the antenna array 1008 and the weight combiner module 1006 is also referred to as a phased array antenna.

The relative weights of the signals being applied to the elements at each of the locations within the phase array antenna 1008 will result in the plurality of weighted signals superposing upon one another and thus coherently combining to form a user beam.

Accordingly, by applying desired weighting to the plurality of signals 1002 to generate the beam element signals 1062 output from the weight/combiner module 1006, a signal 1002 applied to each input of the weight/combiner module 1006 can be directed to one of the plurality of user beam coverage areas. Since the satellite 1004 can use the weight/combiner module 1006 and array antenna 1008 to direct any of the received signals to any of the user beam coverage areas, information that would otherwise be transmitted over a particular feeder uplink that is experiencing intolerable fading can be routed to one of the other SANs. Accordingly, the information can be transmitted to the satellite 1004 through a SAN 602 that is not experiencing intolerable fading to provide feed link diversity, as described above in the context of the matrix switch 616. Similar time division multiplexing can be done to transmit signals received by one of the lenses 610 in several user spot beams as described above.

Using a satellite 1004 that has on-board beamforming provides flexibility to allow feeder link diversity with regard to signals received from the plurality of SANs 602. The use of on-board beam forming eliminates the need for the switch matrix 616 shown in FIG. 4. A similar architecture can be employed on the return paths (i.e., the user uplink and the feeder downlink). That is, the user ground terminals 606 transmit an RF signal up to the satellite 1004 on the user uplink. Receive elements in the antenna array 1008 receive the RF signal. The weight/combiner module 1006 weights the received signals received by each receive element of the antenna 1008 to create a receive beam. The output from the weight/combiner module 1006 is down converted from RF to IF.

In some embodiments, the upconverters 626 are placed at the input of the weight/combiner module 1006, rather than at the outputs. Therefore, RF signals (e.g., 20 GHz signals) are weighted and summed. The beam element signals are then transmitted through each of the antenna array elements.

In some embodiments, the satellite has several weight/combiner modules (not shown for simplicity). The inputs to each weight/combiner module are coupled to one or more optical receivers 622. In some embodiments, all of the outputs from one optical receiver 622 are coupled to the same weight/combiner module. Each weight/combiner module generates N outputs. The N outputs from each weight/combiner module are coupled one-to-one to elements of one N-element antenna array (only one shown for simplicity). Accordingly, there is a one-to-one relationship between the antenna arrays 1008 and the weight/combiner modules 1006.

In some embodiments, the second architecture shown in FIG. 12 (i.e., on-board beam forming) is used with a QAM modulator 614, similar to the system 600. However, the satellite 1104 has on-board beamforming.

Figure 14:
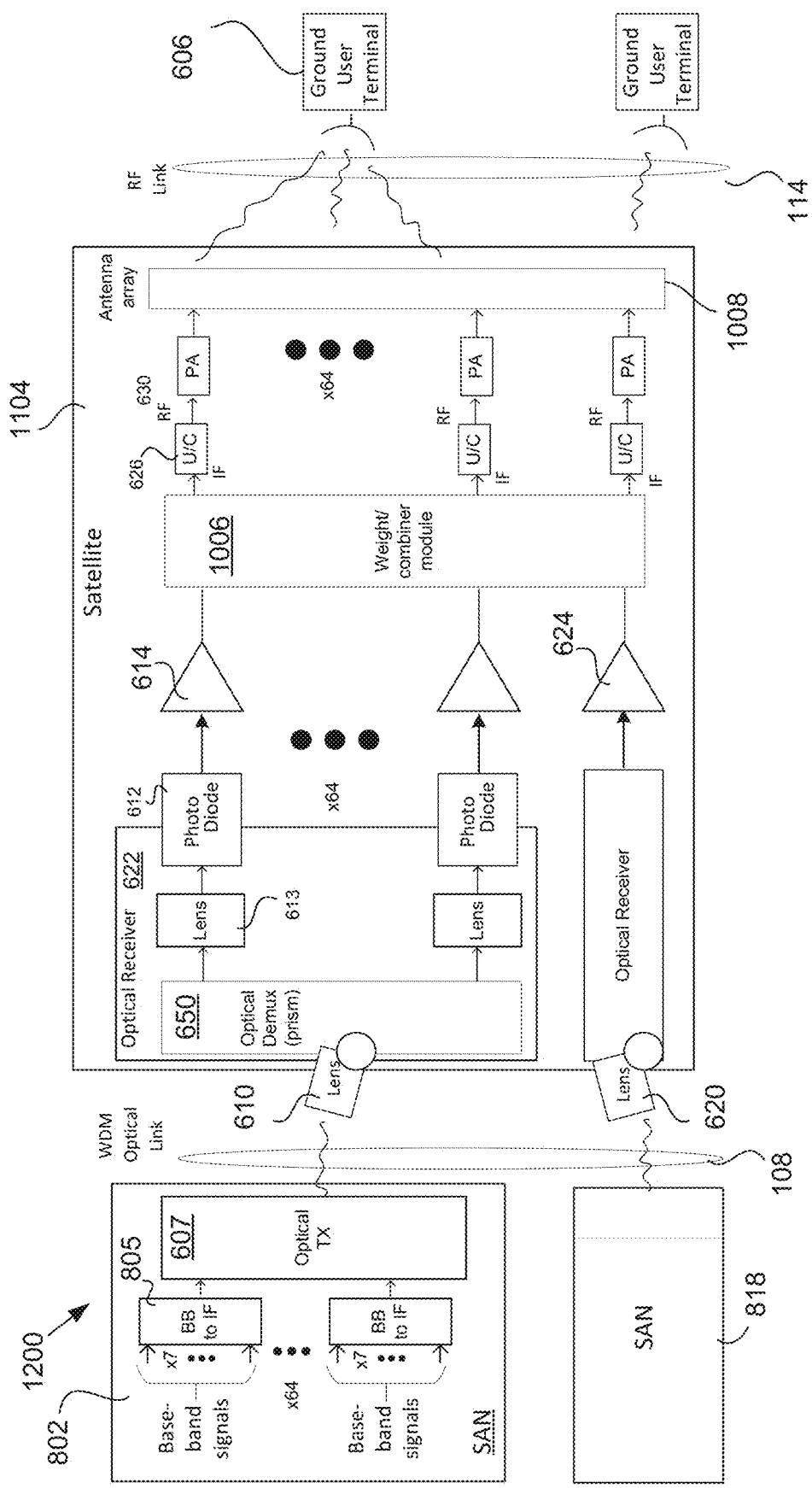
FIG. 14 is a simplified schematic of an example of a system architecture in which an optical signal is RF modulated at a SAN and sent to a satellite that has on-board beamforming capability.

FIG. 14 is a simplified schematic of a system 1200 using the technique discussed with respect to FIG. 8 in which an optical signal is RF modulated at the SAN 802. However, the satellite architecture is similar to that of FIGS. 12 and 11 in which a satellite 1204 has on-board beamforming capability. The SANs 802, lenses 810, optical detectors (such as photodiodes 812), amplifiers 613 and upconverters 626 are all similar to those described with respect to FIG. 8. However, the weight/combiner module 1006 and array antenna 1008 are similar to those described with respect to FIGS. 10, 10A and 11. Similar to the architecture described in FIG. 12, the weight/combiner 1006 and array antenna 1008 allow the satellite 1004 to transmit the content of the signals received from one or more of the SANs 802 to any of the user beam coverage areas, thus providing feeder link diversity. Therefore, if one or more of the feeder uplinks from the SANs 802 to the satellite have an intolerable fade, the content that would otherwise be sent on that feeder uplink can instead be sent through one of the other SANs 802 using a feeder uplink that is not experiencing an intolerable fade.

Figure 15:
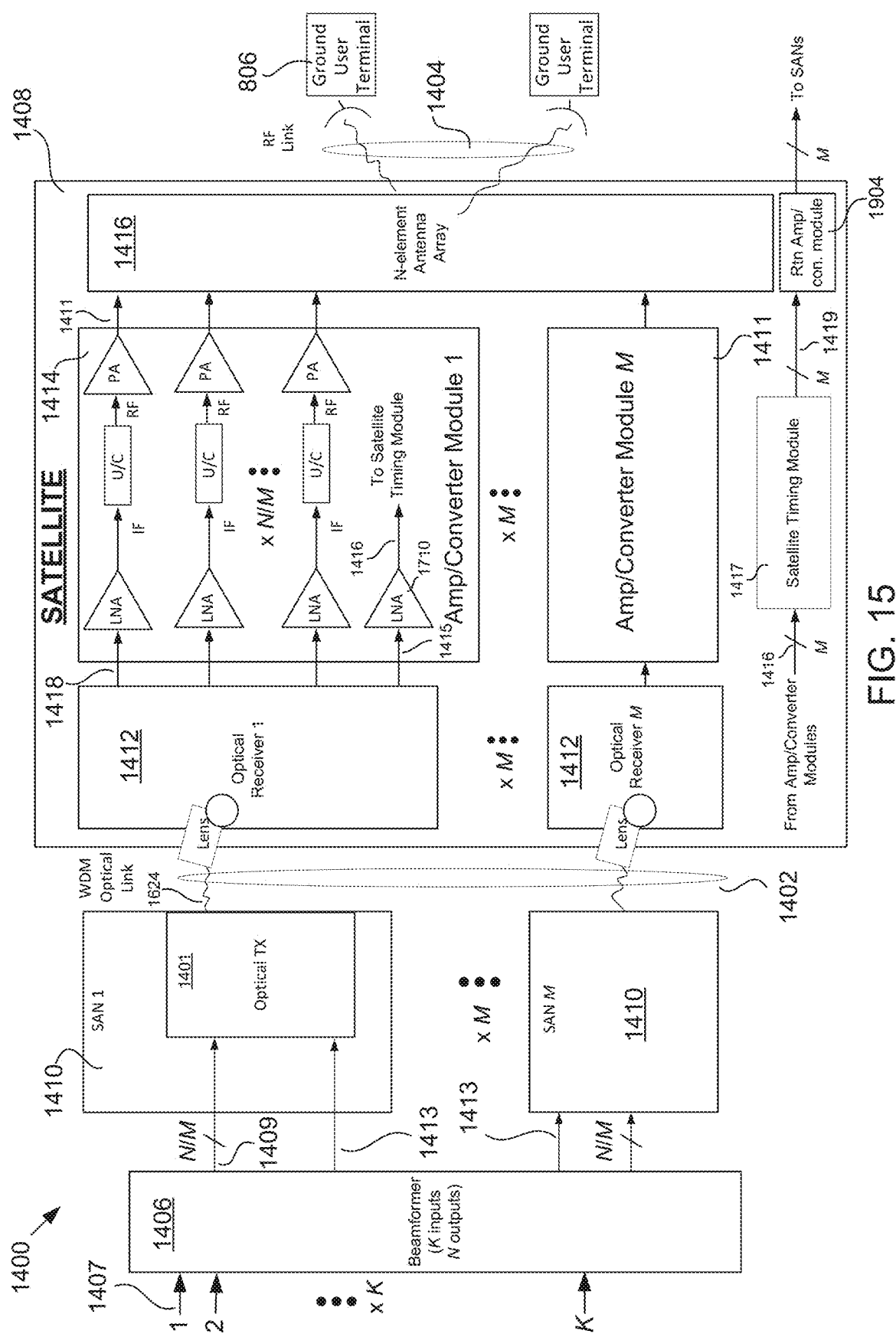
FIG. 15 is an illustration of an example of a forward link of a satellite communications system using ground-based beamforming and including an optical forward uplink and a radio frequency forward downlink.

FIG. 15 is an illustration of a forward link of a satellite communications system 1400 using the third system architecture (i.e., ground-based beamforming) including an optical forward uplink 1402 and a radio frequency forward downlink 1404. In some embodiments, the system 1400 includes a forward link ground-based beamformer 1406, a satellite 1408 and a relatively large number (M) of SANs 1410 to create a relatively large capacity, high reliability system for communicating with user terminals 806 located within 512 user beam coverage areas 1801 (see FIG. 19 discussed in detail below). Throughout the discussion of the system 1400, M=8 SANs 1410 are shown in the example. However, M=8 is merely a convenient example and is not intended to limit the system disclosed, such as system 1400, to a particular number of SANs 1410. Similarly, 64 optical channels are shown in the example of the system 1400. Likewise, the antenna array is shown as having 512 elements. As noted above, the particular frequencies, wavelengths, antenna array elements, and numbers of similar parallel channels, components, devices, user beam coverage areas, etc. should not be taken as a limitation on the manner in which the disclosed systems can be implemented, except where expressly limited by the claims appended hereto.

Forward traffic (i.e., forward beam input signal 1407) to be communicated through the system 1400 is initially provided to the beamformer 1406 from a source, such as the Internet, through distribution equipment, such as a core node or similar entity (not shown). The distribution equipment may manage assignment of frequency and/or time slots for transmissions to individual user terminals and group together data destined for transmission to particular beams, in addition to performing other functions. Input signals 1407 to the beamformer 1406 (or some portion of the information carried by the forward beam input signal 1407) can represent data streams (or modulated data streams) directed to each of 512 user beams. In one embodiment, each of the 512 forward beam input signals 1407 is a 3.5 GHz wide IF signal. In some embodiments, the forward beam input signal 1407 is a composite 3.5 GHz wide carrier that is coupled to the input of the beamformer 1406.

Each of the forward beam input signals 1407 is "directed" to a user beam coverage area 1801 by the beamformer 1406. The beamformer 1406 directs the forward beam input signal 1407 to a particular user beam coverage area 1801 by applying beam weights to the 512 forward beam input signals 1407 to form a set of N beam element signals 1409 (as further described below with respect to FIG. 16). Generally, N is greater than or equal to K. In some embodiments, N=512 and K=512. The 512 beam element signals 1409 are amplified and frequency converted to form RF beam element signals 1411. Each is transmitted from an element of an N-element (i.e., 512-element) antenna array 1416. The RF beam element signals 1411 superpose on one another within the user beam coverage area 1801. The superposition of the transmitted RF beam element signals 1411 form user beams within the user beam coverage areas 1801.

In some embodiments, the 512 beam element signals 1409 are divided among several SANs 1410. Accordingly, a subset of the beam element signals 1409 (e.g., 512/8) are coupled to each SAN 1410, where 8 is the number of SANs 1410. Thus, the combination of 8 SANs 1410 will transmit 512 beam element signals 1409 from the beamformer 1406 to the satellite 1408. In some embodiments, the beamformer 1406 is co-located with one of the SANs 1410. Alternatively, the beamformer 1406 is located at another site. Furthermore, in some embodiments, the beamformer 1406 may be distributed among several sites. In one such embodiment, a portion of the beamformer 1406 is co-located with each SAN 1410. Each such portion of the beamformer 1406 receives all of the forward traffic 1407, but only applies beam weights to those 64 (i.e., 512/8) signals 1409 to be transmitted to the SAN 1410 that is co-located with that portion of the beamformer 1406. In some embodiments, several beamformers are provided (not shown for simplicity). Each beamformer generates N outputs (i.e., beam element signals). The N beam element signals will be coupled one-to-one to elements of one N-element antenna array on the satellite 1408 (only one shown for simplicity). Accordingly, there is a one-to-one relationship between the antenna arrays 1416 and the beamformers 1406. In some embodiments in which all of the beam elements from one beamformer 1406 are transmitted to the satellite 1408 through one SAN 1410, there is no need to coordinate the timing of the transmissions from different SANs 1410. Alternatively, in embodiments in which beam elements output from the same beamformer 1406 are transmitted to the satellite 1408 through different SANs, the timing of the beam element signals is taken into consideration using timing controls as discussed further below.

The phase relationship between each of the RF beam element signals 1411 transmitted from each of the N elements of an antenna array 1416 and the relative amplitude of each, determines whether the beam element signals will be properly superpose to form beams within the desired user beam coverage areas 1801. In some embodiments in which there are 8 SANs 1410 (i.e., M=8) each SAN 1410 receives 64 beam element signals 1409.

In order to maintain the phase and amplitude relationship of each of the 512 RF beam element signals 1411 to one another, the beamformer 1406 outputs 8 timing pilot signals 1413, one to each SAN 1410, in addition to the N beam element signals 1409. Each timing pilot signal 1413 is aligned with the other timing pilot signals upon transmission from the beamformer 1406 to each SAN 1410. In addition, the amplitude of each timing pilot signal 1413 is made equal.

Figure 16:
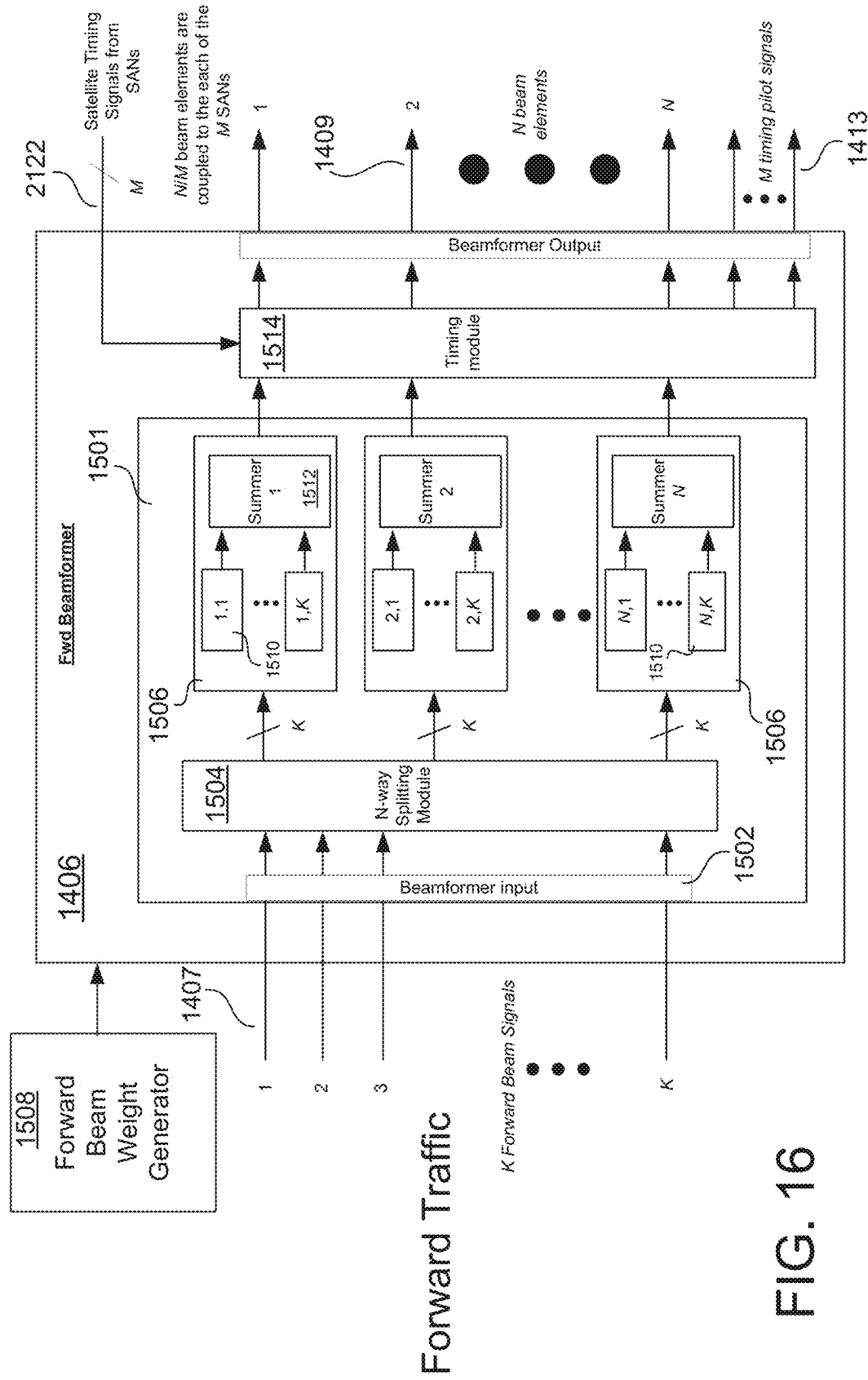
FIG. 16 is an example of a forward beamformer used in a system performing ground-based beamforming.

FIG. 16 is a detailed illustration of the forward beamformer 1406. The forward beamformer 1406 receives 512 forward beam signals 1407 representing the forward traffic to be sent through the system 1400. The signals 1407 are received by a matrix multiplier 1501. The matrix multiplier 1501 includes a beamformer input module 1502, a 512-way splitting module 1504 and 512 weighting and summing modules 1506. Other arrangements, implementations or configurations of a matrix multiplier can be used. Each of the 512 forward beam signals 1407 is intended to be received within a corresponding one of 512 user beam coverage areas 1801. Accordingly, there is a one-to-one relationship between the 512 user beam coverage areas 1801 and the 512 forward beam signals 1407. In some embodiments, the distribution equipment (e.g., the core node) that provides the forward traffic to the beamformer 1406 ensures that information to be transmitted to a particular user beam coverage area 1801 is included within the forward beam input signal 1407 corresponding to that user beam coverage area 1801.

The 512-way splitting module 1504 splits each of the 512 forward beam signals 1407 into 512 identical signals, resulting in 512×512 (i.e., N×K) signals being output from the 512-way splitting module 1504. When N is equal to 512 and K is equal to 512, the splitting module 1504 outputs 512×512=524,288 signals. 512 unique signals output from the splitting module 1504 are coupled to each of the 512 weighting and summing modules 1506. The signals coupled to each of the weighting and summing modules 1506 are weighted (i.e., phase shifted and amplitude adjusted) in accordance with beam weights calculated by a forward beam weight generator 1508. Each of 512 weighted signals corresponding to the same array element N are summed in one of 512 summers 1512.

Since each group of 64 outputs from of the summers 1512 will be coupled to, and transmitted by, a different one of the 8 SANs 1410, a timing module 1514 is provided. The timing module 1514 adjusts when the beam element signals 1409 are sent from the beamformer to ensure that each group of 64 IF beam element signals 1409 arrives at the user beam coverage area 1801 at the appropriate time to ensure that the superposition of the signals 1409 results in the proper formation of the user beam. Alternatively, the forward beam weights can be generated taking into account differences in lengths and characteristics of the paths from each SAN 1410 to the satellite 1408. Accordingly, a signal 2122 would be coupled to the forward beamformer 1406. In some embodiments, the timing module 1514 generates the timing pilot signal 1413 transmitted from the forward beamformer 1406 to each SAN 1410. In some embodiments, one timing pilot signal 1413 is generated and split into 8 copies of equal amplitude, one copy sent to each SAN 1410. Alternatively, the amplitude of the copies may be a predetermined ratio. As long as the ratio between timing pilot signals 1413 is known, RF beam element signals 1411 can be equalized to ensure that they will superpose with one another to form the desired user spot beams. In some embodiments in which the corrections to alignment are made in the timing module 1514 within the beamformer 1406, each SAN 1410 returns a signal 2122 derived from the SAN timing correction signal 1419 to a timing control input to the beamformer to allow the forward beamformer 1406 to determine corrections to the alignment of the signals to each SAN 1410. In some embodiments, SAN timing correction signals 1419 are then used by the timing module 1514 to adjust the timing of the beam element signals 1409. In other embodiments, the SAN timing correction signal 1419 are used by the forward beam weight generator 1508 to adjust the beam weights to account for differences in the paths from the beamformer 1406 through each of the SANs 1410 to the satellite 1408. As noted above, corrections to the alignment can alternatively be made in each SAN 1410.

Once the beam element signals 1409 have been properly weighted and any necessary timing adjustments made, each of the 512 signals 1409 are coupled to one of the SANs 1410. That is, each of the 8 SANs 1410 receives 64 beam element signals 1409 (i.e., 512/8) from the forward beamformer 1406. An optical transmitter 1401 within each SAN 1410 receives, multiplexes and modulates those 64 beam element signals 1409 that it receives onto an optical carrier.

Figure 17:
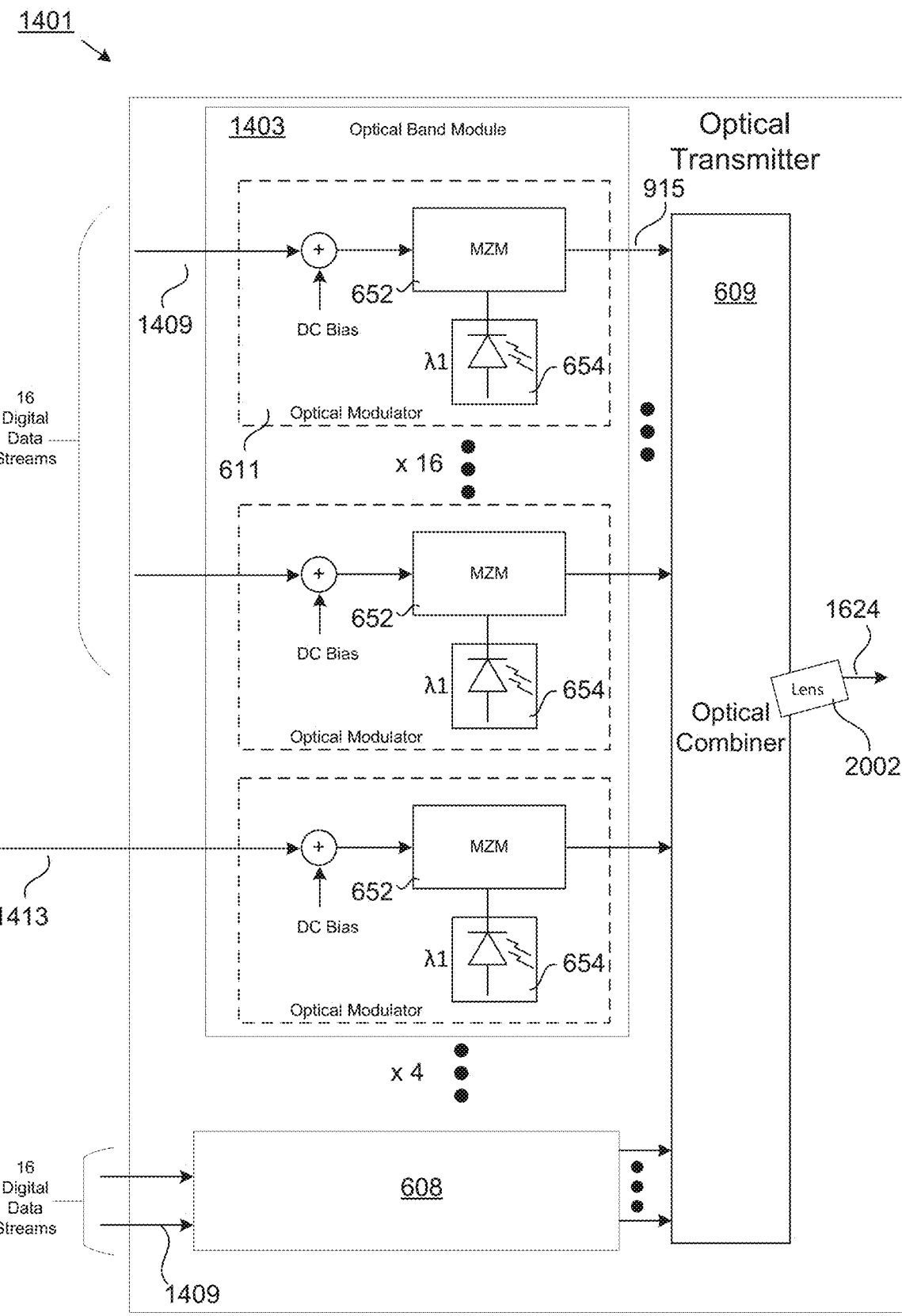
FIG. 17 is a more detailed illustration of an example of the return link components within the example

FIG. 17 is an illustration of an optical transmitter 1401 used in some embodiments of the system 1400. The optical transmitter 1401 is similar to the optical transmitter 607 discussed above with respect to FIG. 10. However, the input signals 1409 differ, since they are beam weighted by the beamformer 1406. Furthermore, the timing pilot signal 1413 provided by the beamformer 1406 is coupled to an optical modulator 611 and modulated onto an optical carrier within the same band as the band of other optical modulators 611 within the same optical band module 1403, as determined by the wavelength of the light source 654 within that optical modulator 608. In some embodiments, each optical band module 1403 is identical. However, modulating the timing pilot signal 1413 need only be done in one such optical band module 1403. Alternatively, as shown in FIG. 17, only one optical band module 1403 is configured to modulate a timing pilot signal 1413. The other optical band modules 608 may be similar to the optical band module 608 show in FIG. 6 and described above. In either embodiment, in a system in which 8 SANs 1410 each receive 64 beam element signals 1409 and modulate them onto 16 optical channels within 4 different optical bands, as shown in FIG. 5, there are four optical band modules within the optical transmitter 1401 in each SAN 1410.

The timing pilot signal 1413 follows the same path to the satellite as the IF beam element signals 1409. Therefore, by comparing the arrival time of the timing pilot signals sent from each SAN 1410 at the satellite 1408, differences in the arrival times of the IF beam element signals can be determined and correction signals can be generated and transmitted to each SAN 1410. Similar to the optical transmitter 607, the optical channels 915 output by each optical modulator 611 shown in FIG. 17 are combined in an optical combiner 609. The composite optical signal 1624 is emitted from an optical lens 2002 within the optical transmitter 1401. The optical lens 2002 operates as an optical signal transmitter capable of transmitting an optical signal to the satellite 1408.

A composite optical signal 1624 from each of the SANs 1410 with the 64 beam element signals 1409 and the timing pilot signal 1413 is transmitted to the satellite 1408 on the optical forward uplink 1402 and received by one of 8 optical receivers 1412 within the satellite 1408. Each of the 8 optical receivers 1412 within the satellite 1408 demultiplexes the 64 optical channels 915 from the composite optical signal 1624.

Figure 18:
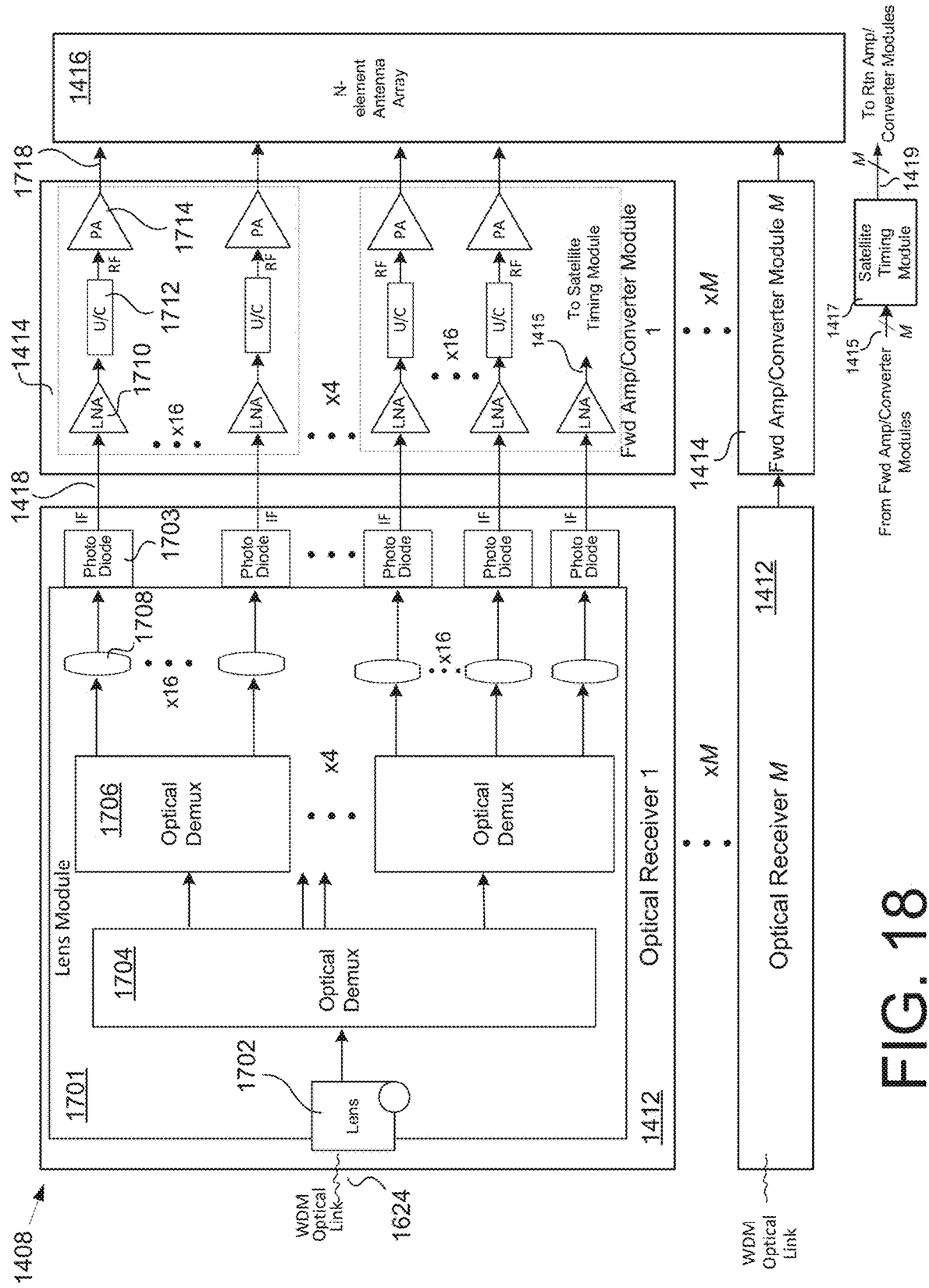
FIG. 18 is a simplified illustration of components of a satellite used for receiving and transmitting the forward link of an example system using ground-based beamforming.

FIG. 18 shows the components of a satellite 1408 (see FIG. 15) in greater detail.

The Satellite 1408 receives and transmits the forward link in accordance with some embodiments of a system using ground-based beamforming, as noted above with reference to FIG. 15. The components of the forward link of the satellite 1408 include 8 optical receivers 1412, 8 amplifier/converter modules 1414 and a 512-element antenna array 1416. In some embodiments of the system 1400, similar to the embodiments shown in FIGS. 9, 13 and 16, in which there are 8 SANs (i.e., M=8), the received composite signal 1624 includes 64 optical channels divided into 4 bands of 16 each, each of which carries a 3.5 GHz wide IF channel. Furthermore, there are K=512 user beam coverage areas 1801 and N=512 elements in the antenna array. As noted elsewhere in the present discussion, these numbers are provided merely as an example and for ease of discussion.

Each optical receiver 1412 is associated with a corresponding amplifier/converter module 1414. The optical receivers 1412 each include a lens module 1701, and a plurality of optical detectors, such as photodiodes 1703. The lens module 1701 includes a lens 1702 (which in some embodiments may be similar to the lens 610 described above with respect to FIG. 4), an optical demultiplexer 1704, a plurality of optical demultiplexers 1706 and a plurality of output lenses 1708.

In operation, the composite optical signal 1624 is received from each of the 8 SANs 1410. A lens 1702 is provided to receive each composite optical signal 1624. In some embodiments, the lenses 1702 can be focused (in some embodiments, mechanically pointed) at a SAN 1410 from which the lens 1702 is to receive an composite optical signal 1624. The lens 1702 can later be refocused to point to a different SAN 1410. Because the lenses 1702 can be focused to receive composite optical signal 1624 from one of several SANs 1410, the satellite 1408 can receive signals from 8 SANs 1410 selected from among a larger number 8+X SANs 1410. In some embodiments X=24. Therefore, 32 different SANs 1410 are capable of receiving information intended to be communicated to user beam coverage areas 1801 in the system. However, only eight of the 32 SANs 1410 are selected to have information that is transmitted be received by the satellite 1408.

The signal path of one of the composite optical signals 1624 through the forward link of the satellite 1408 is now described in detail. It should be understood that each of the 8 signal paths taken by the 8 received composite optical signals 1624 through the forward link of the satellite 1408 operate identically. The composite optical signal 1624 that is received by the lens 1702 is directed to an optical demultiplexer 1704. In a system using the modulation scheme illustrated in FIG. 9, the optical demultiplexer 1702 splits the composite optical signal 1624 into the four bands 907, 909, 911, 913 (see FIG. 9). That is, the optical demultiplexer 1704 splits the composite optical signal 1624 into the four optical wave lengths onto which the beam element signals 1407 were modulated by the SAN 1410 that sent the composite optical signal 1624. Each of the optical outputs from the optical demultiplexer 1704 is coupled to a corresponding optical demultiplexer 1706. Each of the four optical demultiplexers 1706 output 512/(4×8) optical signals for a total of 4×(512/(4×8)=512/8=64 optical signals. Each of the 16 optical signals output from the four optical demultiplexers 1706 is directed to an output lens 1708. Each of the output lenses 1708 focus the corresponding optical signal onto a corresponding photo detector, such as a photodiode 1703. Each photodiode 1703 detects the amplitude envelope of the optical signal at its input and outputs an RF transmit beam element signal 1418 corresponding to the detected amplitude envelope. Accordingly, the RF transmit beam element signals 1418 output from the optical receivers 1412 are essentially the beam element signals 1409 that were modulated onto the optical signals by the SANs 1410.

The RF output signals are then coupled to the amplifier/converter module 1414. The amplifier/converter module 1414 includes 512/8 signal paths. In some embodiments, each signal path includes a Low noise amplifier (LNA) 1710, frequency converter 1712 and PA 1714. In other embodiments, the signal path includes only the frequency converter 1712 and the PA 1714. In yet other embodiments, the signal path includes only the PA 1714 (the frequency converter 1712 can be omitted if the feed signals produced by the SANs are already at the desired forward downlink frequency). The frequency converter 1712 frequency converts the RF transmit beam element signals 1418 to the forward downlink carrier frequency. In some embodiments, the output of each upconverter 1712 is an RF carrier at a center frequency of 20 GHz. Each of the 512 outputs from the 8 amplifier/converter modules 1414 is coupled to a corresponding one of the 512 elements of the 512-element antenna array 1416. Therefore, the antenna array 1416 transmits the 512 forward downlink beam element signals 1718.

Figure 19:
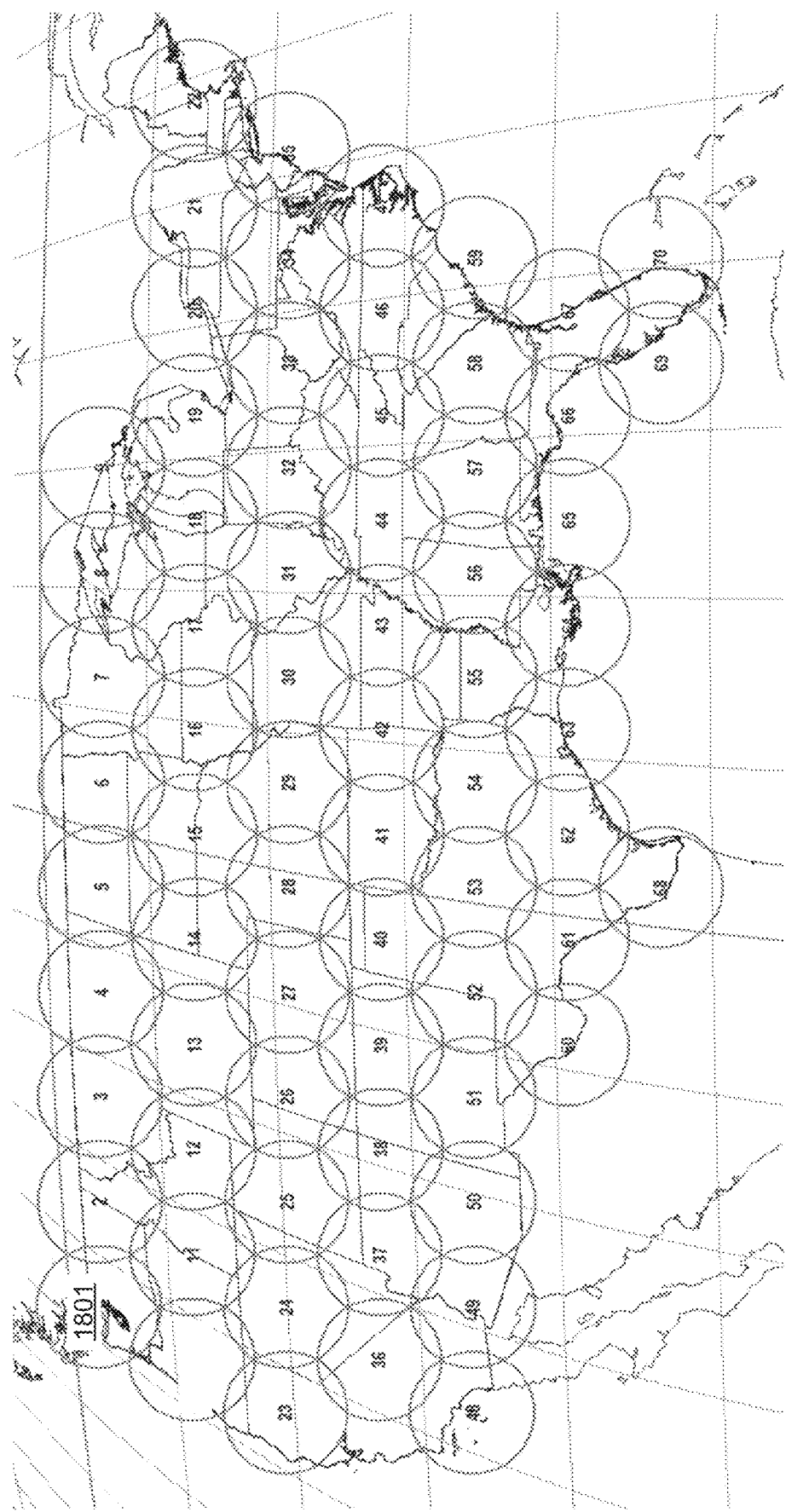
FIG. 19 is an illustration of an example of user beam coverage areas formed over the continental United States.

FIG. 19 is an illustration of user beam coverage areas 1801 formed over the continental United States in accordance with some embodiments. In other embodiments, the user beam coverage areas may be located in different locations and with different spacing and patterns. In some embodiments, such as the embodiments shown in FIGS. 4, 8 and 12, each feed of an antenna is focused to direct a user spot beam to one user beam coverage area. In other embodiments, such as shown in FIGS. 10, 11, 12, 14 and 15, the 512 forward downlink beam element signals 1718 are superposed on one another to form user beams directed to user beam coverage areas 1801. As shown in FIG. 19, user beam coverage areas are distributed over a satellite service area that is substantially larger than the user beam coverage areas 1801. The 512 element antenna array 1416 transmits the RF beam element signals 1411 over the forward downlink 1404 to each of the 512 user beam coverage areas 1801. User terminals 806 within each user beam coverage area 1801 receive the user beam directed to that particular user beam coverage area 1801 by virtue of the superposition of the RF beam element signals 1411 transmitted from each of the 512 elements of the 512 element antenna array 1416.

In addition to the IF beam element signals 1418 output from each optical receiver 1412, each optical receiver 1412 demultiplexes a satellite timing signal 1415 from the composite optical signal 1624. A satellite timing signal 1415 is output from each receiver 1412 and coupled the corresponding amp/converter module 1414. An LNA 1710 within the amp/converter module 1414 amplifies the satellite timing signal 1415. The output 1416 of the LNA 1710 is coupled to a satellite timing module 1417. In some embodiments, the satellite timing module 1417 compares the satellite timing signal 1415 received by each optical receiver 1412 to determine whether they are aligned. The satellite timing module 1417 outputs 8 SAN timing correction signals 1419, one to be returned to each of the 8 SANs 1410. In some embodiments, each SAN timing correction signal 1419 is coupled to an input to a return amp/converter module 1904 (see FIG. 24). Each SAN timing correction signal 1419 is amplified, frequency converted to the forward downlink frequency and coupled to an input to one of 8 optical transmitters 1401 within the satellite 1408, similar to the optical transmitter 1401 provided in the SAN 1410. In some embodiments, one of the eight is a reference for the other seven. Accordingly, no correction is made to the timing of the signals transmitted from the SAN 1410 from which the reference satellite timing signal was sent. Therefore, no SAN timing correction signal 1419 is sent for that SAN 1410. The SAN timing correction signal 1419 is modulated onto each composite optical signal transmitted by the satellite 1408 to each SAN 1410.

Figure 20:
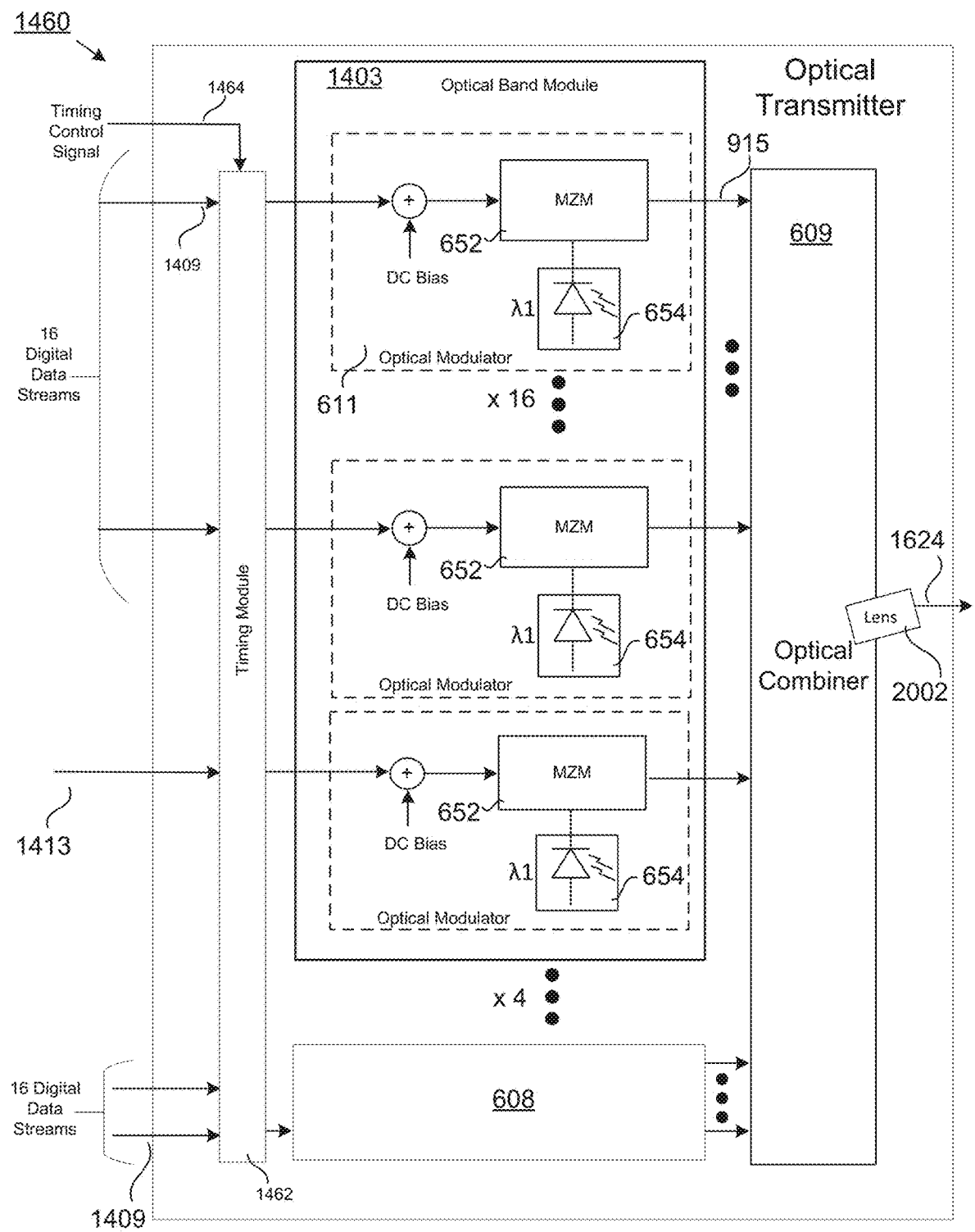
FIG. 20 is an illustration of an example of an optical transmitter having a timing module for adjusting the timing of the beam element signals and the timing pilot signal.

Each SAN timing correction signal 1419 provides timing alignment information indicating how far out of alignment the timing pilot signal 1413 is with respect to the other timing pilot signals (e.g., the reference satellite timing signal 1415). In some embodiments, the timing information is transmitted through the SANs 1410 to a timing module 1514 (see FIG. 16) in the beamformer 1406. The timing module 1514 adjusts the alignment of the beam elements prior to sending them to each SAN 1410. Alternatively, the timing alignment information is used by each SAN 1410 to adjust the timing of the transmissions from the SAN 1410 to ensure that the RF beam element signals 1411 from each SAN 1410 arrive at the satellite 1408 in alignment. FIG. 20 is an illustration of an optical transmitter 1460 having a timing module 1462 for adjusting the timing of the beam element signals 1409 and the timing pilot signal 1413. The timing module 1462 receives a timing correction signal 1464 from satellite 1408 over the return downlink (discussed in further below). The timing module applies an appropriate delay to the signals 1409, 1413 to bring the signals transmitted by the SAN 1410 into alignment with the signals transmitted by the other SANs 1410 of the system 1400.

In an alternative embodiment, timing adjustments can be made to the RF beam element signals 1411 within the satellite based on control signals generated by the satellite timing module 1417. In some such embodiments, the control signals control programmable delays placed in the signal path between the optical receiver 1412 and the antenna array 1416 for each RF beam element signal 1411.

In an alternative embodiment, at least two of the satellite timing signals 1415 are transmitted from the satellite back to each SAN 1410. The first is a common satellite timing signal 1415 that is transmitted back to all of the SANs. That is, one of the received satellite timing signals 1415 is selected as the standard to which all others will be aligned. The second is a loop back of the satellite timing signal 1415. By comparing the common satellite timing signal 1415 with the loop back satellite timing signal 1415, each SAN 1410 can determine the amount of adjustment needed to align the two signals and thus to align the IF beam element signals 1418 from each SAN 1410 within the satellite 1410.

Figure 21:
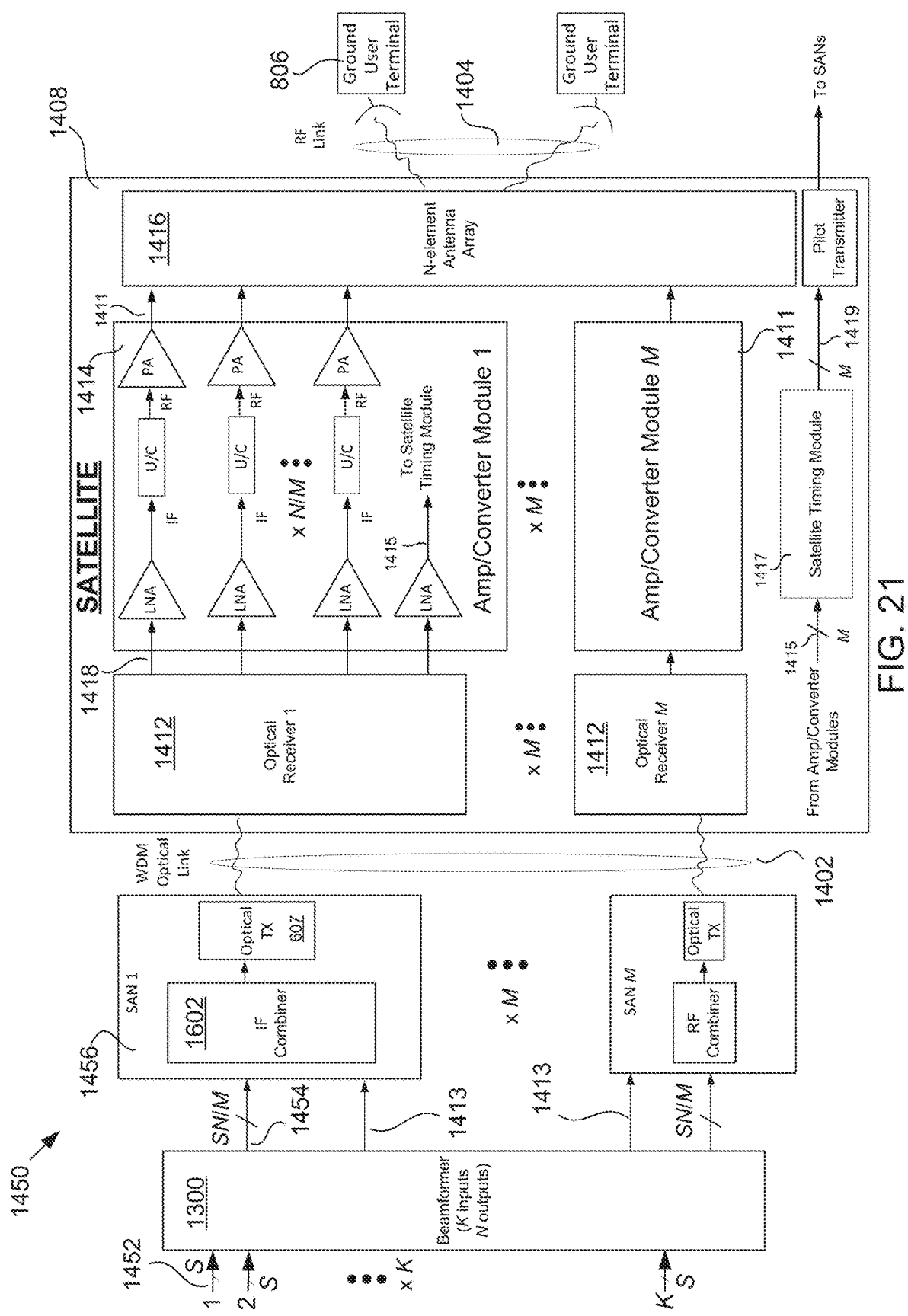
FIG. 21 is a system in which each of the K forward beam input signals contain S 500 MHz wide sub-channels.
Figure 22:
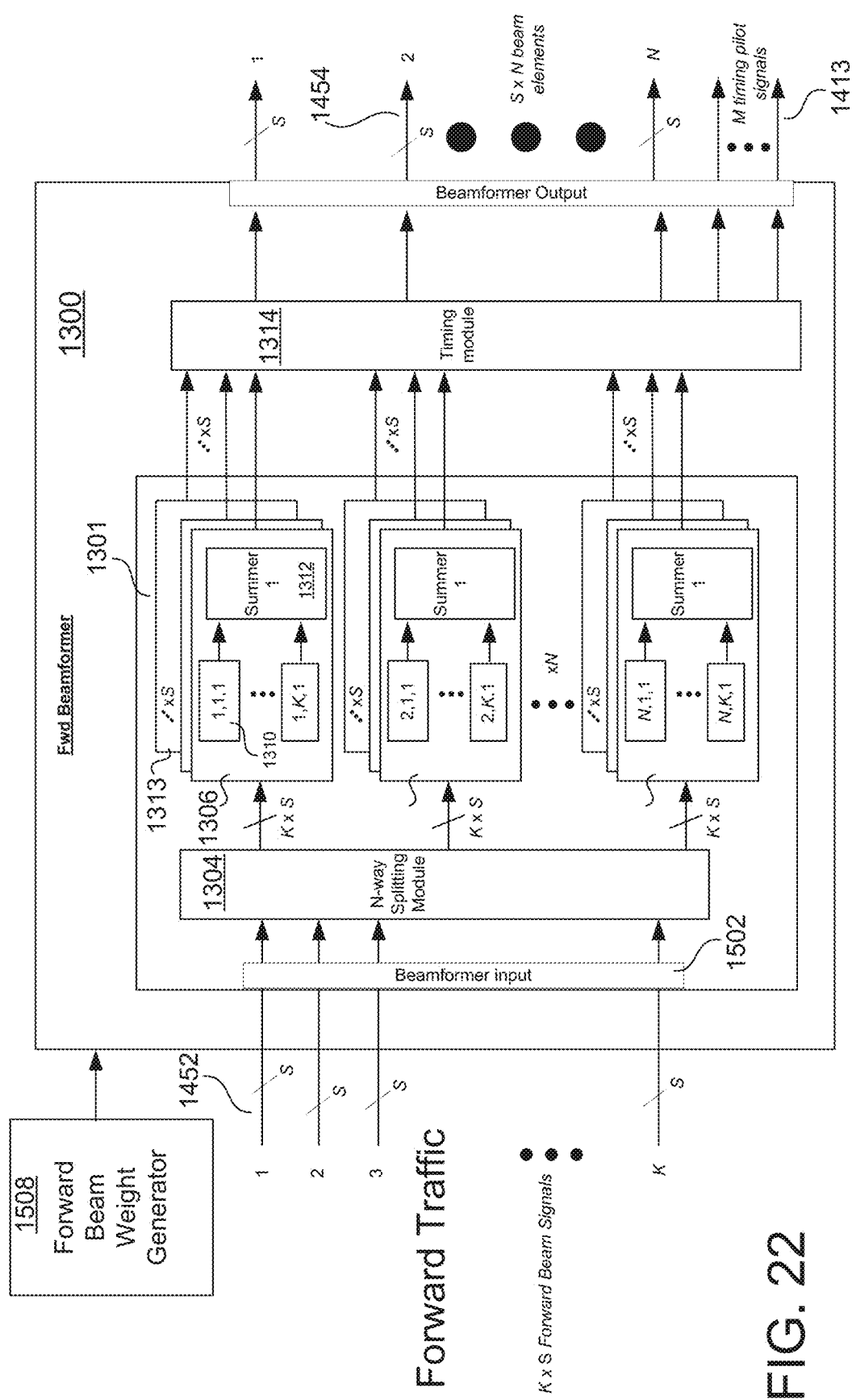
FIG. 22 is a simplified block diagram of an example of a beamformer.

FIG. 21 is a system 1450 in which each of the K forward beam input signals 1452 contain S 500 MHz wide sub-channels. In some embodiments, K=512 and S=7. For example, in some embodiments, seven 500 MHz wide sub-channels are transmitted to one user coverage area 1801. FIG. 22 is an illustration of a beamformer 1300 in which forward beam input signals 1452 comprise seven 500 MHz wide sub-channels, each coupled to a unique input to the beamformer 1300. Accordingly, as noted above, the sub-channels can be beamformed after being combined into an IF carrier, as shown in FIGS. 14, 15. Alternatively, as shown in FIGS., 21, 13, the sub-channels 1452 can be beamformed before being combined using the beamformer 1300. Accordingly, the beamformer 1300 outputs S×N beam element signals, with (S×N)/M such beam element signals being sent to each SAN 1410. In the example system 1450, S=7, N=512 and M=8. As noted above, these numbers are provided as a convenient example and are not intended to limit the systems, such as the system 1450, to these particular values.

FIG. 22 is a simplified block diagram of a beamformer 1300 in which each carrier comprises S sub-channels 1452, where S=7. Each of the sub-channels 1452 is provided as independent input to a matrix multiplier 1301 within the beamformer 1300. Therefore, 512×7 sub-channels 1452 are input to the matrix multiplier 1301, where there are 512 user spot beams to be formed and 7 is the number of sub-channels in each carrier; that is, K=512 and S=7. The 512-way splitter 1304 receives each of the 512×7 sub-channels 1407, where 512 is the number of elements in the antenna array 1416. Alternatively, N may be any number of antenna elements. Each sub-channel 1452 is split 512 ways. Accordingly, 512×512×7 signals are output from the splitter 1304 in a three-dimensional matrix. The signals 1, 1, 1 through 1, K, 1 (i.e., 1, 512, 1 where K=512) are weighted and summed in a weighting and summing module 1306. Likewise, the signals 1, 1, 7 through 1, 512, 7 are weighted and summed in a weighting and summing module 1313. In similar fashion, each of other weighting and summing modules weight receive outputs from the splitter 1304, and weight and sum the outputs. The 512×7 outputs from the weighting and summing modules 1306, 1313 are coupled to the inputs of a timing module 1514. The timing module functions essentially the same as the timing module 1514 of the beamformer 1406 discussed above. The beamformer 1300 outputs 512×7 beam element signals 1454 to the SANs 1410. Each of the 8 SANs 1410 comprises an IF combiner 1602.

Figure 23:
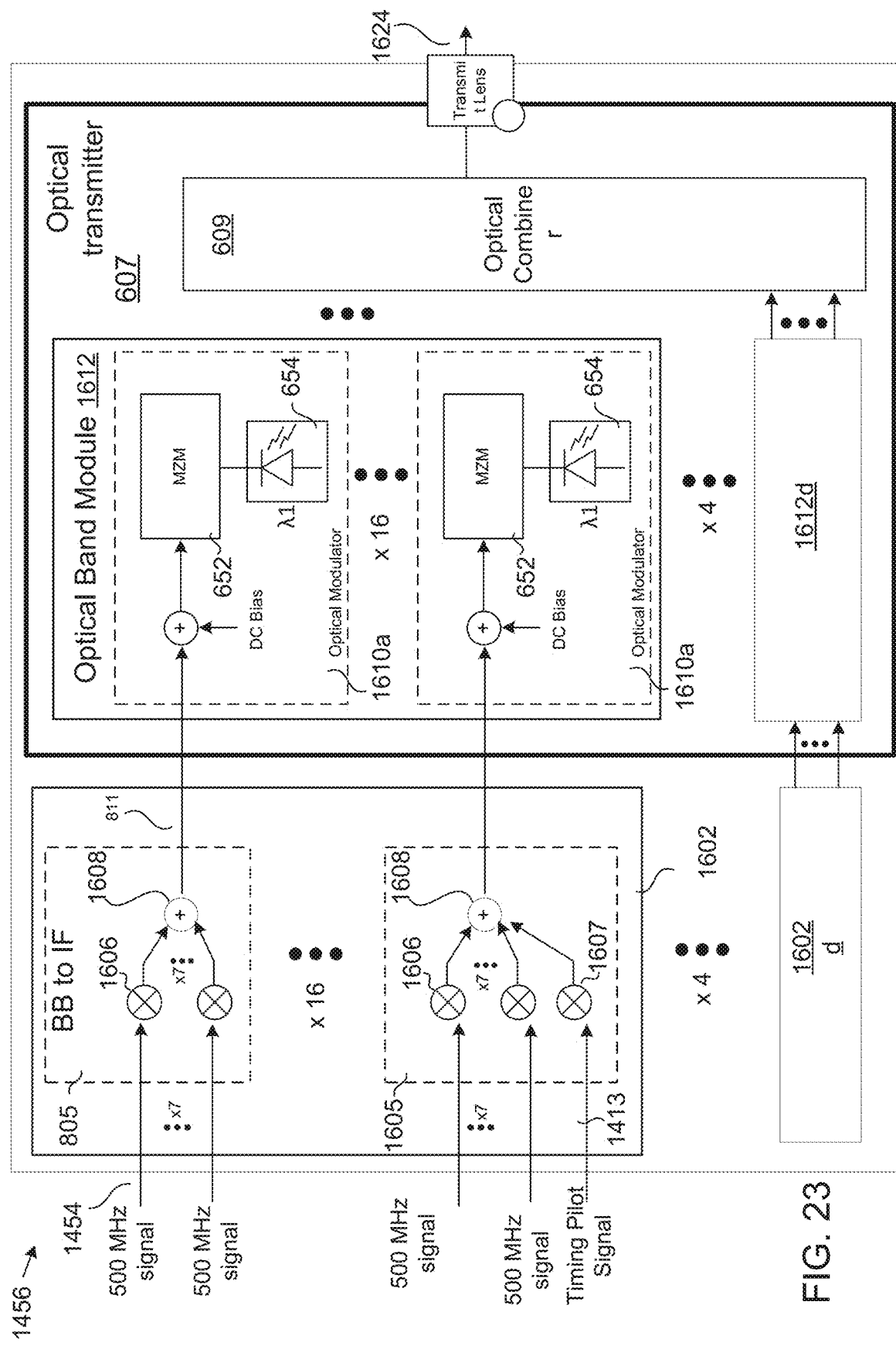
FIG. 23 is an illustration of an example of a SAN.

FIG. 23 is an illustration of a SAN 1456 of system 1450. In some embodiments, a first baseband to IF converter 805 operates in similar fashion to the baseband to IF converter 805 discussed above with respect to FIG. 10. The converter 805 outputs a signal 811 that is a combination of seven 500 MHz beam element signals 1454. In addition, in some embodiments, at least one of the baseband to IF converters 1605 includes an additional frequency converter 1607. The additional frequency converter 1607 receives the timing pilot signal 1413 from the beamformer 1300. The timing pilot signal 1413 is combined with the beam element sub-channels 1452 and coupled to the optical transmitter 607. Each of the IF signals 811 coupled to the optical transmitter 607 are combined in the optical combiners 609 of each SAN 1410 to form the transmitted composite optical signal 1624. The timing pilot signal 1413 is coupled to the input of a frequency converter 1607. The frequency converter 1607 places the timing pilot signal at a frequency that allows it to be summed with the beam element signals 1454 by the summer 1608. Alternatively, the timing pilot signal 1413 can be directly coupled to an additional optical modulator 1610 dedicated to modulating the timing pilot signal 1413. The output of the additional modulator 1610 is coupled to the combiner 609 and combined with the other signals on a unique optical channel dedicated to the timing pilot signal.

Figure 24:
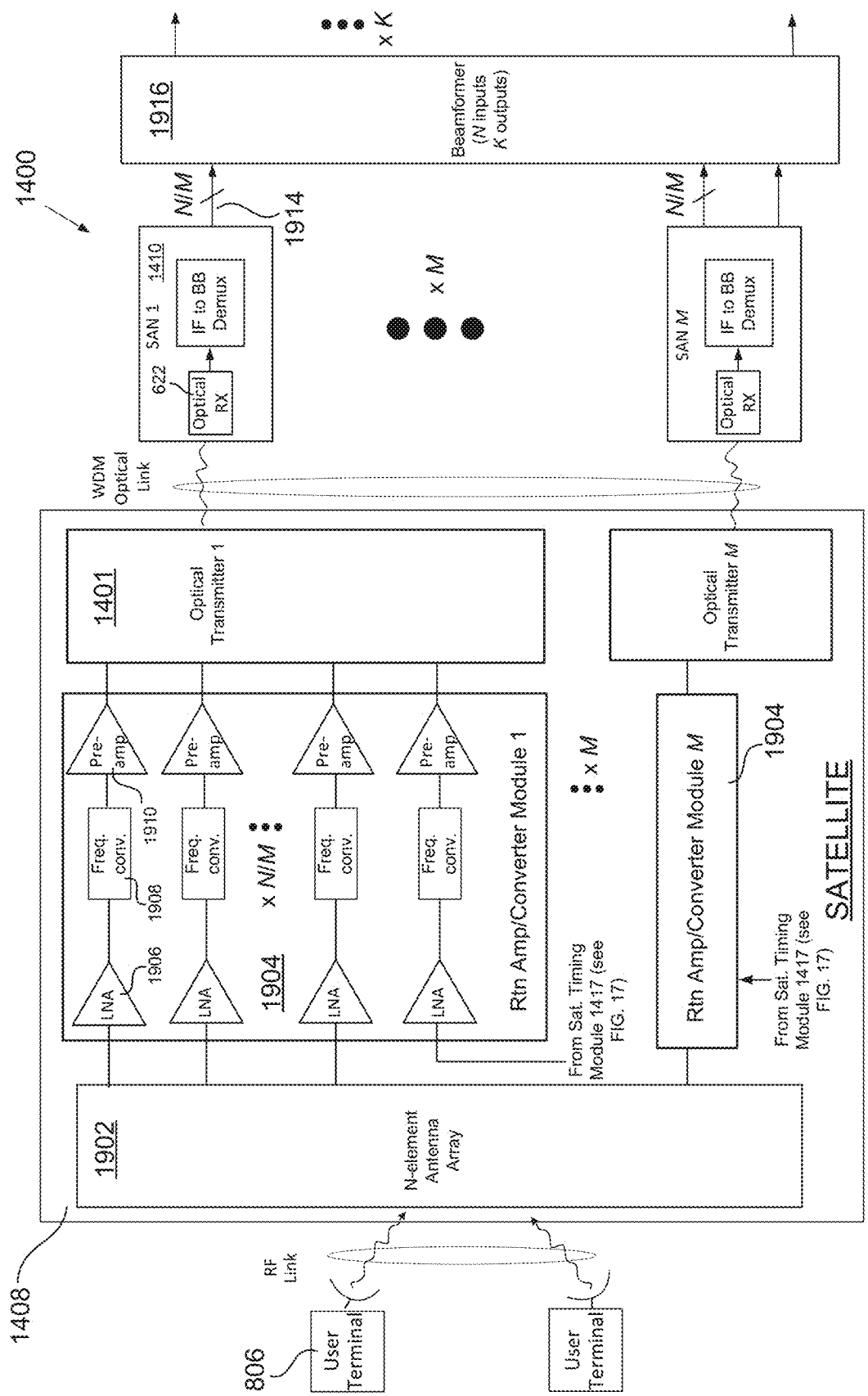
FIG. 24 is an illustration of an example of a return link for a system having ground-based beamforming.

FIG. 24 is an illustration of a return link for the system 1400 having ground-based beamforming. User terminals 806 located within a plurality of 512 user beam coverage areas 1801 transmit RF signals to the satellite 1408. An 512-element antenna array 1902 on the satellite 1408 (which may or may not be the same as the antenna array 1416) receives the RF signals from the user terminals 806. 512/8 outputs from the 512-element antenna array 1902 are coupled to each of the 8 amplifier/converter modules 1904. That is, each element of the antenna array 1902 is coupled to one LNA 1906 within one of the amplifier/converter modules 1904. The output of each LNA 1906 is coupled to the input to a frequency converter 1908 and a pre-amplifier 1910. The amplified output of the LNA 1906 frequency down-converted from RF user uplink frequency to IF. In some embodiments, the IF signal has a bandwidth of 3.5 GHz. In some embodiments, the pre-amp 1910 provides additional gain prior to modulation onto an optical carrier. The outputs of each amplifier/converter modules 1904 are coupled to corresponding inputs to one of 8 optical transmitters 1401, similar to the optical transmitter 607 of FIG. 4. Each of 8 optical transmitters 1401 outputs and transmits an optical signal to a corresponding SAN 1410. The SAN 1410 receives the optical signal. The SAN 1410 outputs 512/8 return beam element signals 1914 to a downlink beamformer 1916. The downlink beamformer 1916 processes the return beam element signals 1914 and outputs 512 beam signals 1918, each corresponding with one of 512 user beam coverage areas 1801.

The IF signals provided to the optical transmitter 607 from the amplifier/converter module 1904 are each coupled to one of 512/8 optical modulators 611. For example, if there are 512 elements in the antenna array 1902 (i.e., N=512) and there are 8 SANs 1410 in the system 1900, then 512/8=64.

In a system in which the IF signals are modulated onto wavelengths divided into 4 bands, such as shown in FIG. 9, the optical modulators 611 are grouped together in optical band module 608 having 512/(4×8) optical modulators 611.

Each optical modulator 611 is essentially the same as the uplink optical modules 611 of the SAN 1410 shown in FIG. 10, described above. Each optical modulator 611 within the same optical band module 608 has a light source 654 that produces an optical signal having one of 16 wavelengths k. Accordingly, the output of each optical modulator 611 will be at a different wavelength. Those optical signals generated within the same optical band module 608 will have wavelengths that are in the same optical band (i.e., in the case shown in FIG. 9, for example, the optical bands are 1100 nm, 1300 nm, 1550 nm and 2100 nm). Each of those optical signals will be in one of 16 optical channels within the band based on the wavelengths $\lambda 2$. The optical outputs from each optical modulator 611 are coupled to an optical combiner 609. The output of the optical combiner 609 is a composite optical signal that is transmitted through an optical lens 2016 to one of the SANs 1410. The optical lens 2016 can be directed to one of several SANs 1410. Accordingly, the 8 optical transmitters each transmit one of 8 optical signals to one of 8 SANs 1410. The particular set of 8 SANs can be selected from a larger group of candidate SANs depending upon the quality of the optical link between the satellite and each candidate SAN.

Figure 25:
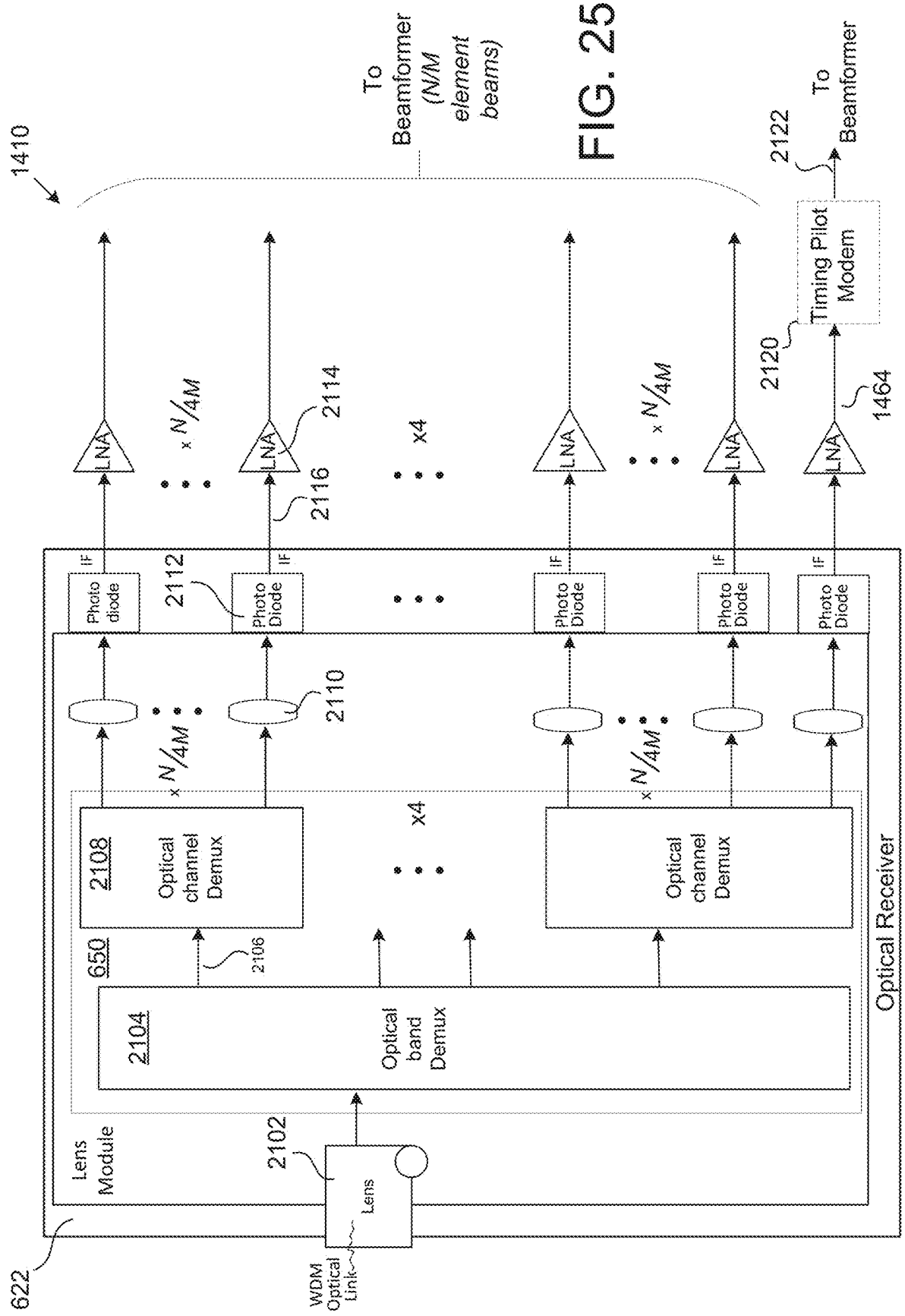
FIG. 25 is an illustration of an example of one of the SANs in the return link.

FIG. 25 is an illustration of one of the SANs 1410 in the return link. An optical receiver 622 comprises lens 2102 that receives optical signals directed to the SAN 1410 from the satellite by the lens 2016. An optical band demultiplexer 2104 separates the optical signals into optical bands. For example, in some embodiments in which there are four such bands, each of the four optical outputs 2106 are coupled to an optical channel demultiplexer 2108. The optical channel demultiplexer 2108 separates the 512/(4×8) signals that were combined in the satellite 1408. Each of the outputs from the four optical channel demultiplexers 2108 are coupled to a corresponding lens 2110 that focuses the optical output of the optical channel demultiplexers 2108 onto an optical detector, such as a photodiode 2112. Output signals 2116 from the photodiodes 2112 are each coupled to one of 512/8 LNAs 2114. The output from each LNA 2114 is coupled to the return link beamformer 1916 (see FIG. 24). In addition, one channel output from the optical receiver 622 outputs a timing correction signal 1464 that is essentially the SAN timing correction signal 1419 (see FIG. 18) that was provided by the satellite timing module to the return amplifier/converter module 1414. In some embodiments, the timing correction signal 1464 is coupled to a timing pilot modem 2120. The timing pilot modem outputs a signal 2122 that is sent to the forward beamformer 1406. In other embodiments, the timing correction signal 1464 is coupled to a timing control input of the timing module 1462 (see FIG. 20) discussed above.

Figure 26:
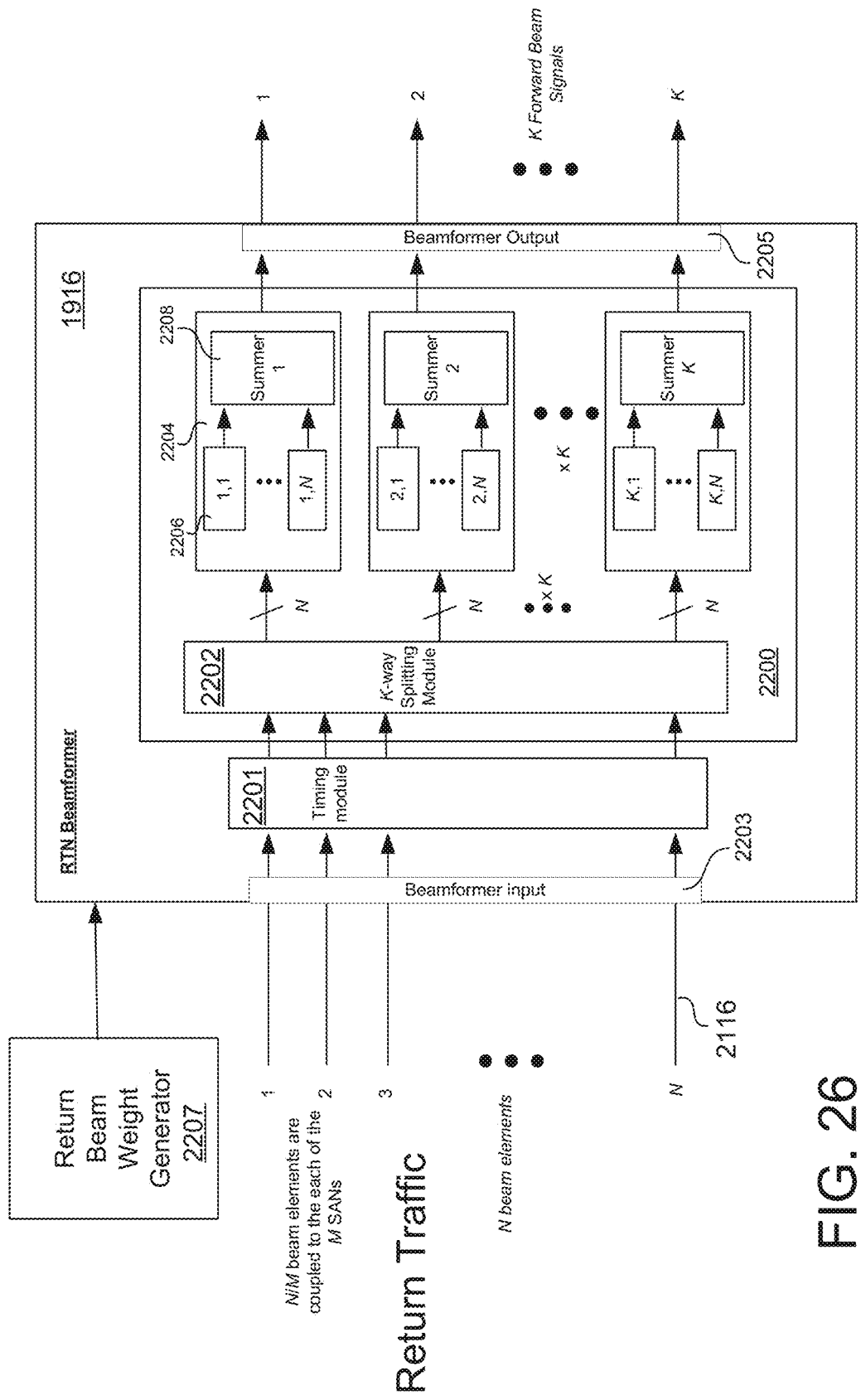
FIG. 26 is an example of an illustration of an example return beamformer

FIG. 26 illustrates in greater detail, a return beamformer 1916 in accordance with some embodiments of the disclosed techniques. Each of the 512 outputs signals 2116 is received by the return beamformer 1916 from each of the SANs 1410. The return beamformer comprises a beamforming input module 2203, a timing module 2201, matrix multiplier 2200 and a beamformer output module 2205. The matrix multiplier 2200 includes a K-way splitting module 2202 and 512 weighting and summing modules 2204. The matrix multiplier 2200 multiplies a vector of beam signals by a weight matrix. Other arrangements, implementations or configurations of a matrix multiplier 2200 can be used. Each signal 2116 is received by the beamformer 1916 in the beamformer input module 2203 and coupled to the timing module 2201. The timing module 2201 ensures that any differences in the length and characteristics of the path from the satellite to the SAN 1410 and from the SAN 1410 to the return beamformer 1916 is accounted for. In some embodiments, this may be done by transmitting one pilot signal from the return beamformer 1916 to each SAN 1410, up to the satellite and retransmitting the pilot signal back through the SAN 1410 to the return beamformer 1916. Differences in the paths between the return beamformer 1916 and the satellite can be measured and accounted for.

The output of the timing module is coupled to a K-way splitter 2202 that splits each signal into 512 identical signals. 512 unique signals are applied to each of 512 weighting and summing circuits 2204. Each of the 512 unique signals is weighted (i.e., the phase and amplitude are adjusted) within a weighting circuit 2206, such that when summed in a summing circuit 2208 with each of the 512 other weighted signals, a return link user beam is formed at the output of the return beamformer.

Each of the architectures described above are shown for an optical uplink to the satellite. In addition, an optical downlink from the satellite to SANs on Earth operates essentially the reverse of the optical uplinks described. For example, with regard to the architecture shown in FIG. 4, an optical downlink from the satellite 602 to the SAN 604 provides a broadband downlink. Rather than lenses 610 for receiving the optical uplink, lasers are provided for transmitting an optical downlink. Furthermore, rather than the bi-phase modulator 614 generating a BPSK modulated signal to be transmitted on an RF carrier, the bi-phase modulator modulates the optical signal using an optical binary modulation scheme. Similarly, an optical downlink can be provided using an architecture similar to that shown in FIG. 4. In this embodiment, the modulator 614 would instead be a QAM demodulator that receives a QAM modulated RF or IF signal and demodulates the bits of each symbol and using binary optical modulation of an optical signal for transmission on the optical downlink. In the embodiment of the architecture shown in FIG. 8, a similar architecture can be used in which the feeder downlink from the satellite to the SAN is optical, the received RF signals from the user terminals 842, 844 are directed by a matrix switch to a laser pointed at the particular SAN selected to receive the signal. The RF signal is RF modulated onto the optical signal similar to the way the feeder uplink optical signal is RF modulated by the baseband/RF modem 811 in the SAN 802.

In some embodiments, the lasers used to transmit an optical feeder downlink signal are pointed to one of several SANs. The SANs are selected based upon the amount of signal fade in the optical path from the satellite to each available SAN, similar to the manner in which the SANs of FIGS. 4, 8 and 12 are selected.

Although the disclosed techniques are described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed techniques may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of transmitting information through a satellite of a satellite communications system, comprising:
    receiving a plurality of binary data streams within a beamformer, the plurality of binary data streams for transmission to a plurality of user beam coverage areas;
    generating a plurality of beam element signals, each beam element signal generated such that when transmitted from an antenna array in the satellite the plurality of beam element signals superpose with one another to form at least one user spot beam;
    transmitting the plurality of beam element signals from the beamformer to at least one Satellite Access Node (SAN);
    receiving the plurality of beam element signals with the at least one SAN;
    modulating the received plurality of beam element signals onto an optical carrier;

transmitting the modulated optical carrier from the at least one SAN to the satellite;
receiving the modulated optical carrier within the satellite;
demultiplexing the modulated optical carrier and outputting a plurality of optical signals, each of the plurality of demultiplexed optical signals having a wavelength in a unique optical channel;
generating a plurality of analog electrical signals, each having an amplitude determined in response to an optical intensity of one of the demultiplexed optical signals; and
applying the plurality of analog electrical signals to elements of the antenna array such that when the plurality of beam element signals are superposed with one another, they form the at least one user spot beam.

2. The method of claim 1, further including generating the plurality of beam element signals based on a quality of optical links between the satellite and the at least one SAN.

3. The method of claim 1, further including:
generating at least one timing pilot signal within the beamformer;
transmitting the at least one timing pilot signal together with the plurality of beam element signals to a first SAN and a second SAN;
receiving timing pilot signals within the first SAN and the second SAN;
modulating the received timing pilot signals onto a first and second optical carrier in the first and second SAN respectively;
transmitting the first and second optical carrier from the corresponding SANs;
receiving in the satellite the first and second optical carrier from the first and second SAN;
demodulating the first and second optical carrier to obtain a corresponding first and second timing pilot signal in the satellite;
determining a time difference between the first timing pilot signal and the second timing pilot signal, and generating a timing correction signal based on the time difference; and
transmitting the timing correction signal to the first and second SAN.

4. The method of claim 3, further including delaying the transmission of the plurality of beam element signals from one or both of the SANs to reduce the time difference.

5. The method of claim 3, wherein each of the first and the second SAN receives a subset of the plurality of beam element signals.

6. The method of claim 3, further comprising positioning lenses within the satellite to receive optical signals from a subset of the SANs, wherein SANs are included in the subset based on an attenuation of optical signals transmitted over an optical link between each of the SANs and the satellite.

7. The method of claim 6, wherein the positioning lenses further comprises redirecting a lens away from the first SAN and pointing the lens at the second SAN if the optical link between the satellite and the second SAN has less attenuation than the optical link between the satellite and the first SAN.

\* \* \* \* \*